(12) United States Patent
Ellis

(10) Patent No.: US 11,385,673 B1
(45) Date of Patent: Jul. 12, 2022

(54) DIGITAL DATA PROCESSING CIRCUITRY

(71) Applicant: David James Ellis, Cheney, WA (US)

(72) Inventor: David James Ellis, Cheney, WA (US)

(*) Notice: Subject to any disclaimer, the term of this patent is extended or adjusted under 35 U.S.C. 154(b) by 1129 days.

(21) Appl. No.: 15/936,297

(22) Filed: Mar. 26, 2018

Related U.S. Application Data

(63) Continuation-in-part of application No. 14/580,620, filed on Dec. 23, 2014, now abandoned.

(60) Provisional application No. 61/923,330, filed on Jan. 3, 2014.

(51) Int. Cl.
  *G06F 1/08* (2006.01)
  *G06F 1/02* (2006.01)
  *G06V 10/94* (2022.01)

(52) U.S. Cl.
  CPC .............. *G06F 1/08* (2013.01); *G06F 1/022* (2013.01); *G06V 10/94* (2022.01); *G06V 10/955* (2022.01)

(58) Field of Classification Search
  CPC .......... G06F 1/08; G06F 1/022; G06V 10/94; G06V 10/955
  USPC ......................................................... 706/48
  See application file for complete search history.

(56) References Cited

U.S. PATENT DOCUMENTS

| | | | | |
|---|---|---|---|---|
| 4,078,192 A * | 3/1978 | Fultz | ...................... | G06F 1/025 708/276 |
| 5,870,728 A * | 2/1999 | Yatsuzuka | ................ | G06N 3/08 706/16 |
| 8,577,821 B1 * | 11/2013 | Humphrey | ............. | G06N 3/049 706/22 |
| 2003/0120385 A1 * | 6/2003 | Etienne-Cummings | ..................... | G06N 3/061 700/245 |
| 2010/0257130 A1 * | 10/2010 | Smallridge | ............... | G06N 3/02 706/15 |
| 2011/0025532 A1 * | 2/2011 | Markram | .............. | H04L 25/493 341/61 |
| 2012/0084241 A1 * | 4/2012 | Friedman | ............... | G06N 3/088 706/27 |
| 2012/0308076 A1 * | 12/2012 | Piekniewski | .......... | G06N 3/049 382/103 |
| 2014/0351186 A1 * | 11/2014 | Julian | .................... | G06N 3/088 706/20 |

OTHER PUBLICATIONS

Alabi, Oluwatosin O., "Final Office Action dated Dec. 28, 2017", U.S. Appl. No. 14/580,620, The United States Patent and Trademark Office, dated Dec. 28, 2017.

(Continued)

*Primary Examiner* — Clifford Hilaire
*Assistant Examiner* — Kristin Dobbs
(74) *Attorney, Agent, or Firm* — Lindauer Law, PLLC

(57) ABSTRACT

Digital data processing circuitry is described that uses combinatorial logic hardware and sequential logic hardware to process one or more inputs. For each input a periodic sequence is generated that is based at least in part on a value of the input and a weight value. A match is determined at an event time when the periodic sequence(s) matches a corresponding arbitrary reference pattern. The digital data processing circuitry may be implemented as an integrated circuit as part of an interconnected network of devices that may be trained and subsequently used for recognition or other complex data processing tasks.

6 Claims, 30 Drawing Sheets

(56) References Cited

OTHER PUBLICATIONS

Alabi, Oluwatosin O., "Non-final Office Action dated Jul. 27, 2017", U.S. Appl. No. 14/580,620, The United States Patent and Trademark Office, dated Jul. 26, 2017.

Caron, et al., "FPGA Implementation of a Spiking Neural Network for Pattern Matching", Universite de Sherbrooke, Quebec, Canada, 2011 IEEE International Symposium on Circuits and Systems (ISCAS), pp. 649-652, May 15-18, 2011.

Duch, et al., "Survey of Neural Transfer Functions", Neural Computing Surveys 2, pp. 163-212, 1999. [Retrieved on Dec. 30, 2014] Retrieved from the Internet: <URL:ftp://ftp.icsi.berkeley.edu/pub/ai/jagota/vol2_6.pdf>.

Izhikevich, Eugene M., "Simple Model of Spiking Neurons", IEEE Transactions on Neural Networks, vol. 14, No. 6, pp. 1569-1572, IEEE, Nov. 2003.

Jain, et al., "Artificial Neural Networks: A Tutorial", IEEE, pp. 31-44, Mar. 1996. Retrieved from the Internet:<URL:http://www.cogsci.ucsd.edu/~ajyu/Teaching/Cogs202_sp12/Readings/jain_ann96.pdf>.

Johnston, et al., "An FPGA Hardware/Software CO-Design Towards Evolvable Spiking Neural Networks for Robotics Applications", World Scientific Publishing Company, International Journal of Neural Systems, vol. 20, No. 6, pp. 447-461, 2010.

Krips, et al., "FPGA Implementation of a Neural Network for a Real-Time Hand Tracking System", IEEE Computer Society, Proceedings of the First IEEE International Workshop on Electronic Design, Test and Applications (DELTA 02), IEEE, 2002.

Kunkle, et al., "Pulsed Neural Networks and their Application", Computer Science Dept., College of Computing and Information Sciences, Rochester Institute of Technology, New York, Feb. 2002, pp. 1-11. Retrieved from the Internet: <URL:http://citeseerx.ist.psu.edu/viewdoc/download?doi=10.1.1.136.9453&rep=rep1&type=pdf>.

Lewis, Edwin R., "Using Electronic Circuits to Model Simple Neuroelectric Interactions", Proceedings of the IEEE, vol. 56, No. 6, pp. 931-949, IEEE, Jun. 1968.

Liao, Yihua, "Neural Networks in Hardware: A Survey", LSU School of Electrical Engineering and Computer Science, Department of Computer Science, University of California, 18 pages. Retrieved from the Internet: <URL:http://bit.csc.isu.edu/~jianhua/shiv2.pdf>.

Omondi, et al., "FPGA Implementation of Neural Networks", Springer International Publishing AG, Netherlands, 2006, pp. 1-363. Retrieved from the Internet:<URL:http://lab.fs.uni-lj.si/lasin/wp/IMIT_files/neural/doc/Omondi2006.pdf>.

Terasic Technologies, Inc., "DE2-115 Users Manual", 2010. Retrieved from the Internet:<URL:ftp://ftp.altera.com/up/pub/Altera_Material/13.0/Boards/DE2-115/DE2_115_User_Manual.pdf>, 2010.

Texas Instruments Inc., "Hex Inverters", SDLS029C, Dec. 1983—Revised Jan. 2004. Retrieved from the Internet:<URL:http://www.ti.com/lit/ds/symlink/sn74ls04.pdf>.

Texas Instruments Inc., "Quadruple 2-Input Positive-and Gates", SDLS033, Dec. 1983—Revised Mar. 1988. Retrieved from the Internet:<URL:http://www.ti.com/lit/ds/symlink/sn74ls08.pdf>.

Texas Instruments, Inc., "4-Bit Magnitude Comparators", SDLS123, Mar. 1974—Revised Mar. 1988, 10 pages. Retrieved from the Internet: <URL:http://www.ti.com/lit/ds/symlink/sn74ls85.pdf>.

Texas Instruments, Inc., "CMOS Quad Exclusive-OR and Exclusive-NOR Gate", Data sheet acquired from Harris Semiconductor, SCHS055E, Jan. 1998—Revised Sep. 2003, 31 pages.

Texas Instruments, Inc., "Dual D-Type Positive-Edge-Triggered Flip-Flops with Preset and Clear", SDLS119, Dec. 1983—Revised Mar. 1988, 25 pages. Retrieved from the Internet:<URL:http://www.ti.com/lit/ds/symlink/sn74ls74a.pdf>.

Texas Instruments, Inc., "Hex/Quadruple D-Type Flip-Flops With Clear", SDLS068A, Dec. 1972—Revised Oct. 2001, 13 pages. Retrieved from the Internet:<URL:http://www.ti.com/lit/ds/symlink/sn74ls175.pdf>.

Texas Instruments, Inc., "Quadruple 2-Input Positive-NOR Gates", SDLS027, Dec. 1983—Revised Mar. 1988, 23 pages. Retrieved from the Internet:<URL:http://www.ti.com/lit/ds/symlink/sn7402.pdf>.

Texas Instruments, Inc., "Quadruple 2-Input Positive-OR Gates", SDLS100, Dec. 1983—Revised Mar. 1988, 24 pages. Retrieved from the Internet:<URL:http://www.ti.com/lit/ds/symlink/sn74ls32.pdf>.

Texas Instruments, Inc., "Synchronous 4-Bit Up/Down Counters (Dual Clock with Clear)", SDLS074, Dec. 1972—Revised Mar. 1988, 27 pages. Retrieved from the Internet: <URL:http://www.ti.com/lit/ds/symlink/sn74ls193.pdf>.

Wang, et al., "An FPGA Implementation of a Polychronous Spiking Neural Network With Delay Adaptation", Frontiers in Neuroscience, vol. 7, Article 14, Feb. 13, 2013 [Retrieved on Dec. 30, 2014] Retrieved from the Internet: >URL:http://journal.frontiersin.org/Journal/10.3389/fnins.2013.00014/full>.

Wilkes, et al., "Bain on Neural Networks", Brain and Cognition 33, Article No. BR970869, pp. 295-305, Academic Press, 1997.

\* cited by examiner

DIGITAL DATA PROCESSING CIRCUITRY

PRIORITY AND RELATED MATTERS

This application is a continuation-in-part of, and claims priority to, U.S. Non-Provisional patent application Ser. No. 14/580,620 filed on Dec. 23, 2014, entitled "Neural Network System." The entirety of this previously filed application is hereby incorporated by reference.

This application claims priority to U.S. Provisional Patent Application Ser. No. 61/923,330 filed on Jan. 3, 2014, entitled "Neural Network System." The entirety of this previously filed application is hereby incorporated by reference.

INCORPORATION BY REFERENCE

This disclosure incorporates by reference the material submitted in the Computer Program Listing Appendix filed herewith. The material within the Computer Program Listing Appendix is Copyright 2014 David James Ellis, all rights reserved.

BACKGROUND

Devices that provide for pattern recognition are used to control various devices. For example, devices may be used to operate robotics, operate industrial process controls, detect patterns in data sets, and so forth. Traditional devices are computationally intensive and relatively slow to operate. For example, existing devices may use floating-point values and floating-point calculations that have substantial circuitry demands.

Figure 1:
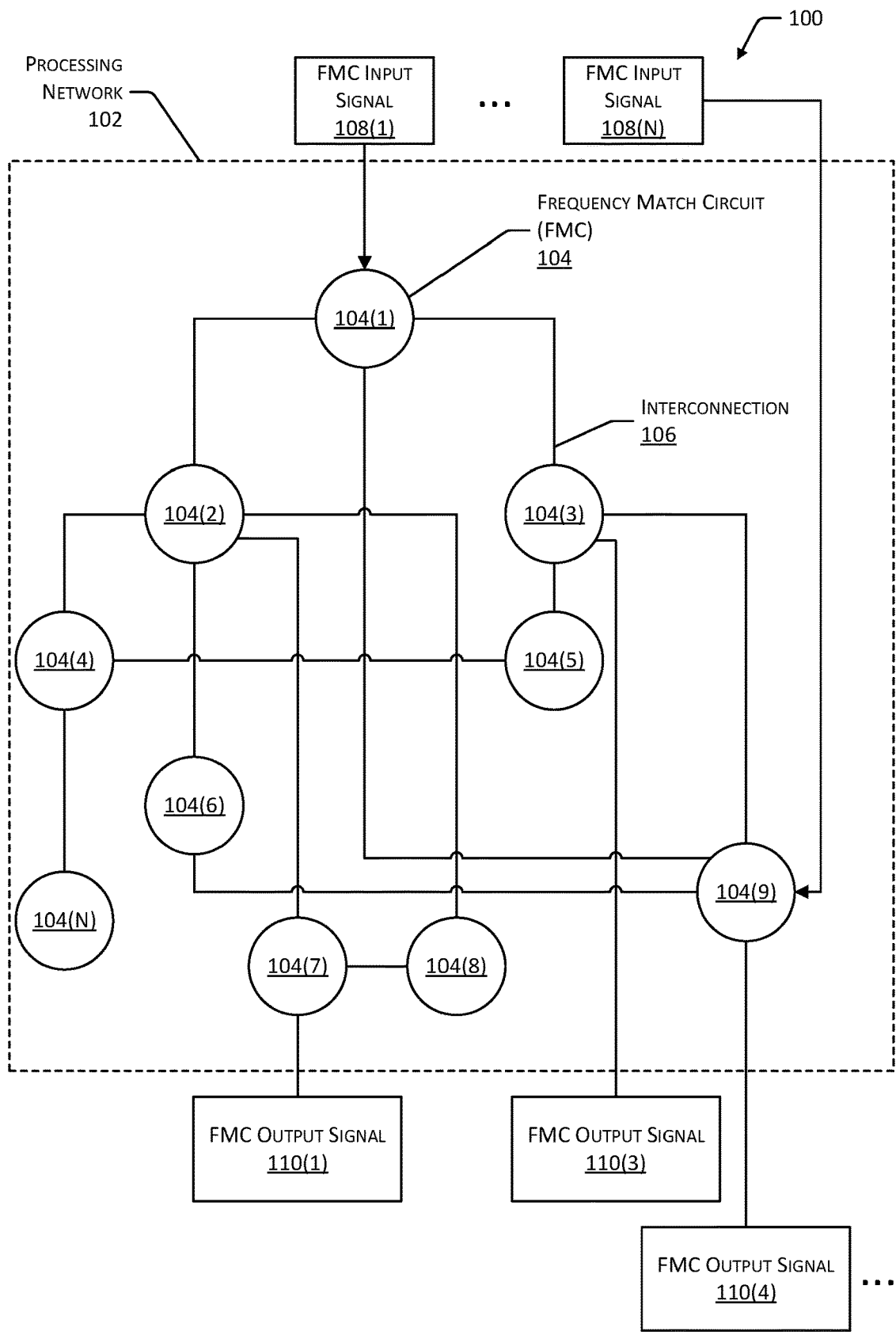
FIG. 1 is one implementation of a processing network using a plurality of frequency match circuits.

Certain implementations and embodiments are described more fully below with reference to the accompanying figures, in which various aspects are shown. However, various aspects may be implemented in many different forms and should not be construed as limited to the implementations set forth herein. Like reference numbers refer to like elements throughout.

DETAILED DESCRIPTION

This disclosure describes digital data processing circuitry that operates to produce a Frequency Match Circuit (FMC). Several FMCs may be operated in conjunction with one another to form a data processing network. The FMC utilizes a combination of combinatorial logic and sequential logic.

Combinatorial logic is one of the two types of digital logic circuitry. Combinatorial logic is defined as logic that is composed of logic gates whose output reacts only to the current logic level of the input to the device. Sequential logic is the second type of digital logic circuitry. Sequential logic is defined as logic whose output is dependent on the current level of the input to the device as well as the present logic level of the output of the device. Sequential logic is also generally controlled and coordinated by a synchronous control often referred to as a clock signal and/or an enable signal.

The circuitry of the FMC utilizes an operating window of arbitrary time in a convenient time base. For example, the operating window may utilize a time base that is measured in seconds, milliseconds, microseconds, nanoseconds, and so forth. The width of the window is defined as an amount of time as measured in one of the time bases as previously defined. The time width of this window is limited and controlled using a digital counter which is referred to as a master counter.

A digital counter is a digital circuit built from sequential logic as previously defined. One version of this type of counter can be based on a series of flip-flops such as D type flip-flops. A D flip-flop has one digital input, one clock input and two digital outputs. The two digital outputs are the inverse of each other. A defined property of a flip-flop is that if one output is at a logic level of 1 the other must be at a logic level of 0. The input is used to send data into the flip-flop. A rising edge controlled flip-flop passes input to the non-inverting output of the flip-flop only when the clock input transitions from a logic 0 to a logic 1. If the inverting output of the flip-flop is connected to the input of the same flip-flop and the clock input is transitioned as described previously, the non-inverting output will be changed to the value of the inverting output. Due to the operation, the output of the flip-flops force the inverting output to change to the opposite of its previous logic state. That is, if the inverting output was a logic 0 the inverting output will become a logic 1, or the inverting output was a logic 1 it will change to a logic 0. This is referred to as "toggling" the flip-flop. If two of these flip-flops are connected in this manner and the inverting output of the first flip-flop is connected to the clock input of the second flip-flop, then the second flip-flop will change its output half as often as the first flip-flop. This is referred to as a "divide by two" circuit. If the two non-inverting outputs are used as a digital word composed of two bits then each time the clock input of the first flip-flop is transitioned from a logic value of 0 to a logic value of 1, this two bit word will count from 00 to 01, then 10, then 11, and back to 00. This describes the basic construction and operation of a simple 2-bit up counter. As many D type flip-flops as necessary can be connoted in this way to build any size digital counter required.

A digital bit, referred to from now on as a "bit", is the smallest form of a digital signal and can have only two possible logic states, a logic 1 or a logic 0. If more than one bit is used then they are called a binary number.

With regard to the circuitry that comprises the FMC, the master counter defines the time size of the operating window of the FMC. For example, if the master counter is based on an 8-bit number and using a time base of microseconds (see the definition of a counter described previously) the window will have a maximum count size of 256 microseconds. The actual time base is defined by how often the clock input of the counter is changed from a logic 0 to a logic 1. The current count output of the master counter then defines the location (or time) within the window. For example, the location is indicative of the amount of time that the master counter has been counting since starting at zero. Therefore, the master counter not only controls the size of the FMCs operating window but defines the current location within that window. Each particular FMC contains its own master counter that is specific to that and only that FMC. The particular FMC's master counter only controls its specific FMC. In one implementation, there is no global master counter that runs an entire network of FMCs. For example, the particular duration of a time window for different FMCs and their respective start and stop times may differ as they are not operating in lockstep. The master counter does utilize a clock input which is used to increment the master counter. This clock input can drive one or all the FMCs used in a network of FMCs.

A clock used in the digital circuit described herein is a time varying square wave that varies only between two levels, a logic 0 level and a logic 1 level. Since the clock output can only vary between two levels, the output may be represented as a square wave. (It is understood that the digital signals may be represented by voltages, and as such there may be a brief time during which there is an intermediate voltage between those used to represent a logic 0 level and a logic 1 level. However, the circuitry as described herein is operating in a digital fashion, and thus such effects may be disregarded for the purposes of discussion.)

Since the clock signal is a type of square wave, it exhibits a specific frequency. For the clock signal, the square wave exhibits a fixed frequency which supplies a fixed reference for all devices connected to the clock signal and is used to synchronize operation of the circuit. Frequency, as used herein, describes a time varying signal that changes magnitude repeatedly within a defined magnitude, period of oscillation, and wave shape. The circuitry of the FMC thus contains a master counter which controls the operating window, such as used to learn or respond to a match, and may also utilize an external clock signal which has a frequency and controls the master counter.

The FMC has one or more digital inputs. As previously defined, a digital input can have only one of two possible values, a logic 0 or a logic 1. With the design described herein, there is no assigned importance to the input being a logic 0 or a logic 1 as they both are used as data that is input to the FMC. The FMC contains a trip weight circuit (TWC), for each input. As described above, the FMC must have at least one digital input but can have many digital inputs. The TWC combines both combinatorial digital logic and sequential digital logic, as described above. The function of the TWC is to generate an oscillating signal starting with the logic value of the digital input to the FMC, that input being a logic value of 0 or a logic value of 1. Since this oscillating signal can only have two levels, this then presents as a waveform of a square wave, as previously defined. This square wave exhibits a frequency which contains a magnitude, period of oscillation, and wave shape. The period, and thus the frequency, of this oscillating signal is controlled by the initial value of the input to the FMC and a weight value. This is accomplished by using a counter and a weight value for each TWC in the FMC. The counter is a digital counter designed similarly to the master counter defined previously. The weight is a digital number that matches the bit size of the counter. The clock that drives the master counter is used to drive the counters in each of the FMCs and TWCs. This keeps the TWCs in sync with the master counter of its FMC.

A digital counter is a digital circuit built from sequential logic. One version of this type of counter can be based on a series of Flip-flops such as D type flip-flops. A D flip-flop has one digital input, one clock input, and two digital outputs. The two digital outputs are the inverse of each other. That is, if one is at a logic level of 1 the other must be at a logic level of 0, this is a defined property of a flip-flop. The input is used to send data into the flip-flop. The input is passed to the non-inverting output of the flip-flop only when the clock input transitions from a logic 0 to a logic 1, this is called a rising edge controlled flip-flop. If the inverting output of the flip-flop is connected to the input of the same flip-flop and the clock input is transitioned as described previously the non-inverting output will be changed to the value of the inverting output. Given the definition of the flip-flop outputs as described previously, this forces the inverting output to change to the opposite of its previous logic state. That is, if the input was a logic 0 it will become a logic 1 or if it was a logic 1 it will change to a logic 0. This is referred to as "toggling" the flip-flop. If two of these flip-flops are connected in this manner and the inverting output of the first flip-flop is connected to the clock input of the second flip-flop, then the second flip-flop will change its output half as often as the first flip-flop. This is referred to as a "divide by two" circuit. If the two non-inverting outputs are used as a digital word composed of two bits, then each time the clock input of the first flip-flop is transitioned from a logic value of 0 to a logic value of 1, this 2-bit word will count from 00 to 01, then 10, then 11, and back to 00. This describes the basic construction and operation of a simple 2-bit counter. Now, as many D type flip-flops as necessary can be connected in this way to build any size digital counter required.

The weight is a binary value with the same number of bits used for the counter in the TWC. The logic value of the FMC's digital input is assigned to the output of the TWC which will be referred to as the trip out value (TrO). The TWC counter will increment in sync with the master counter until the TWC counter's count value equals the weight value. At this point the TrO is inverted, that is if the TrO is a logic value of 0 then it will be changed to a logic value of 1, if the TrO is a logic value of 1 then it will be changed to a logic value of 0. The TWC counter is then reset to a digital value of zero and the count starts again. In this manner the TrO appears to be a square wave with a period that is equal to twice the weight value. This operation is the same for all the logic data inputs to the FMC and each of these inputs will have their own TWC.

Once each of the TWCs has generated a unique signal for each of the FMC logic data inputs, these TrO signals are used by the next circuit in the FMC. The FMC has one transform event circuit (TEC) for each of the TWCs of the FMC. The TEC compares the TrO signals with a binary reference pattern. This reference pattern is a binary pattern that the FMC is being, or has been, trained to identify.

A binary comparator is a basic combinatorial logic circuit that tests to see if one binary value is the same as a second binary value. If the inputs are equivalent, that is the same logic values, a 1 or a 0, then the comparator generates an output that has a logic value of 1. If the inputs are not equivalent, then the binary comparator generates an output that has a logic value of 0. A single bit binary comparator is the result produced by a basic logic gate referred to as an Inverted Exclusive OR (XNOR). To build a comparator that compares two binary values composed of more than one bit is done by using an XNOR gate to compare each bit of the first binary value with its corresponding bit in the second binary value then using an AND gate to bring together all the outputs of the individual XNOR gates. Since the output of an AND gate can only equal a logic value of 1 if all the inputs to the AND gate are at a logic value of 1, the output of the AND gate is the output of the comparator.

Continuing with regard to the FMC circuitry, the TEC compares the TrO signal with one specific bit of the reference pattern during each high level of the clock signal, if a match between the two is found then the TEC generates an output that is set to a logic value of 1, otherwise the TECs output remains at a logic value of 0. Each of the TECs, one for each TWC's TrO signal, provides a found signal. If all the found signals are a logic 1 then the value of the FMC's master counter is captured and this value is temporarily stored in a binary latch. This latched data is the relative time that the TECs found a match between the TrO signals and the reference pattern.

A binary latch is a basic digital circuit based on sequential digital logic devices, to store information. They are based on flip-flops which have been configured to shift the logical data present on their inputs to their outputs only when a control signal is sent to the flip-flop's clock input. To build a one bit latch from a D flip-flop the data to be stored is placed on the D input. Then a control signal is changed from a logic level of 0 to a logic level of 1. The data that is present on the D input will pass to the non-inverted output of the flip-flop and the output will remain in a logic value that matches that data value until the control line makes another change from a logic value of 0 to a logic value of 1, even if the data on the D input changes logic value. To make a latch for binary values greater than one bit, each bit of the binary value will go to a different flip-flop, but the clock input of each flip-flop is controlled by the same control signal.

With regard to the FMC circuitry, the latch that stores the temporary value of the master counter, as discussed previously, is part of the Output circuit (OC) of the FMC. The OC receives the found signal from the TECs and if the found signal is a logic value of 1 the OC compares the temporarily stored value of the master counter with a predefined or learned threshold value. The threshold value is a binary value that has the same bit size as the master counter. If the temporarily stored value of the master counter is smaller than/or equal to the threshold value, then the output of the OC, which is one bit in size, is set to a logic value of 1. If the temporarily stored value of the master counter is greater than the threshold value, the output of the OC is set to a logic value of 0. To find which of the two values is larger a magnitude comparator is used for the comparison. This output value of the OC is the final output value for the FMC.

To determine if one value is greater than the other, each bit of one of the values is inverted and then the two values use an AND operation to combine them then the result of the AND operation is inverted. If this inverted output is a logic value of 1 then the non-inverted value is larger than the inverted value. If the inverted result is a logic value of 0 then the inverted value is larger. By knowing which value was inverted, it is possible to determine which value is larger and also which value is smaller.

Benefits Provided by this Circuitry

The FMC may be utilized as an artificial neuron that offers substantial benefits over existing designs. Previous artificial neuron designs attempt to duplicate the function of biological neurons and are based on mathematical models to calculate a value for the current input to the neuron. If the magnitude of the calculation gets larger than a threshold value these conventional artificial neurons generate an output signal. In contrast, the FMC uses the random probability of the inputs being related to the reference pattern and the quicker the FMC can identify this relationship, the sooner the FMC produces the output. For example, if the input pattern is immediately equal to the reference pattern, the two patterns may be deemed to be the same or matching. In another example, if the determination of a match occurs after x time intervals, then the two patterns are less likely to be the same but may exhibit some similarity. As the time x increases, the probability of a match decreases.

For the FMC, the threshold is the limit of acceptable error in the identification of the input data. To reduce the error in the FMC the threshold value is decreased. To widen the acceptable error in the FMC, the threshold value is increased. This results in quick adjustments and improved throughput. In comparison, other artificial neuron designs calculate the error based on the desired results and the actual results, and the equations are adjusted and recalculated. This difference between the conventional artificial neuron and the FMC produces several benefits. For example, testing reveals that the FMC operates faster than all other known artificial neurons. A processing network that uses FMCs is quicker to train and produces output more quickly than conventional neural networks.

By constructing the hardware in this way, the FMC provides several beneficial characteristics. Compared to existing devices for artificial neurons in hardware, it uses significantly less hardware. This allows for greater operating speed, increased density of the FMCs within an integrated circuit, and simplifies the overall design of integrated circuits.

Experiments performed using the FMC as described herein have demonstrated the ability to be trained with 10-12% of a training set compared to conventional artificial neural networks while being able to correctly identify up to 89% of the entries in a set of test data. By reducing the size of the training set, a processing network that uses the FMC circuitry described herein requires less time, less data, and consumes less electrical power and other resources to train prior to use. For example, by reducing the overall count of circuit elements and the complexity, the overall power consumption of the FMC is less than that of artificial neurons.

The circuitry described herein is also the only known design that can correctly solve a non-separable logic problem with a single FMC, as demonstrated with an XOR/XNOR problem. This allows the circuitry to operate using fewer FMCs and solve problems that would otherwise require additional inputs or circuitry.

A plurality of FMCs may be combined to form a processing network. As described herein, the FMCs may be implemented as circuitry, such as on an integrated circuit or programmable hardware. Programmable hardware includes, but is not limited to, field programmable gate arrays ("FPGA"), field programmable analog arrays ("FPAA"), and so forth. Discrete hardware includes, but is not limited to, application-specific integrated circuits ("ASIC"), individual electronic components, and so forth. In other implementations, the FMCs may be implemented as software configured to execute on one or more processors.

The devices described in this disclosure may be implemented in devices ranging from embedded systems to groups of servers. For example, the FMCs may be implemented as integrated circuits that form processing networks on an ASIC that is embedded within a device, such as a sensor configured to acquire and preprocess images to recognize objects.

In one implementation, the FMC may operate by processing one or more inputs. For each input, a periodic sequence based at least in part on a value of the input and a weight value is generated. The periodic sequence may be time varying. For example, the periodic sequence may be expressed as a square wave which transitions between a binary "0" and "1" at a frequency proportionate to the weight value.

Values of one or more of the periodic sequences may be determined at a particular time, such as an event time, to generate a sampled value. The sampled value, or a portion thereof, may be compared with a reference pattern. Over time, the sampled value may change as the values of the periodic sequences change as well. At the event time, the sampled value matches the reference pattern. For example, a match may comprise an exact binary identity, or a value within a threshold or tolerance range. For example, the match may be determined when "1" of the input equals "1" of the sampled value. In another example, a match may comprise a determination that the values of the input value and the sampled value are within 10%. Values and signals may be described in terms of an analog measure, binary value, and so forth. For example, a value or signal indicative of a "1" may be encoded as a +3V, while a "0" may comprise 0V. In another implementation, values and signals may be expressed as integer values in executable instructions or code.

Once a match has been determined, the event time of when the match occurred may be compared with a threshold value. For example, when the event time of the match occurs at less than the threshold value of time, a "found" signal or other information indicative of the match may be generated. Should the match be found after the event time, at least a portion of the FMC may be reset.

The event time may be used to facilitate training. In one implementation, the event time may be used to provide information as to how well the FMC is performing during training. For example, a decrease in event time from one run to another may indicate successful training.

By operating in the fashion described herein, the FMC may be scaled to form processing networks from few to many neurons without incurring the drawbacks associated with other designs. Operational efficiency in terms of a reduced number of circuit elements, reduced program code complexity and processing requirements, and so forth are also realized. The FMC and processing networks based thereupon may thus be used by devices with constrained resources, or may be used to build highly interconnected processing networks. For example, the FMC-based processing network may execute on the processor of a network accessible camera to provide object recognition functionality. In another example, a supercomputer may execute instructions to generate a massive processing network comprised of FMCs as implemented in executable code.

As one skilled in the art will appreciate in light of this disclosure, certain embodiments may be capable of achieving certain advantages, including some or all of the following: increasing the speed at which a processing network operates, reducing latency of data processing by a processing network, reducing complexity of integrated circuitry that implements a processing network, reducing power consumption by a processing network, and so forth. For example, the processing network implemented with FMCs operates more quickly than conventional artificial neural networks.

Illustrative Discussion

FIG. 1 is one implementation of a system 100 including a processing network 102 using a plurality of frequency match circuits ("FMCs") 104. The FMCs 104 may be interconnected with one another by one or more interconnections 106. The interconnections 106 allow for transfer of a signal or other data between the FMCs 104. The interconnections 106 may comprise wires, circuit traces, optical pathways, storage locations, registers, computer readable storage media, and so forth. The interconnections 106 may be used to interconnect the FMCs 104 in a variety of configurations. These configurations may be symmetrical or asymmetrical such as depicted here. By way of illustration, and not as a limitation, in this example the FMC 104(1) receives the FMC input signal 108(1) and sends information via three interconnections 106 to FMCs 104(2), 104(3), and 104(9). The FMC input signal 108 may be indicative of one or more input values. The input values may be expressed as binary values.

Each FMC 104 may have one or more inputs to receive an FMC input signal 108. The processing network 102 may generate one or more FMC output signals 110. The FMCs 104 may be implemented in hardware, software, or a combination thereof.

Figure 2:
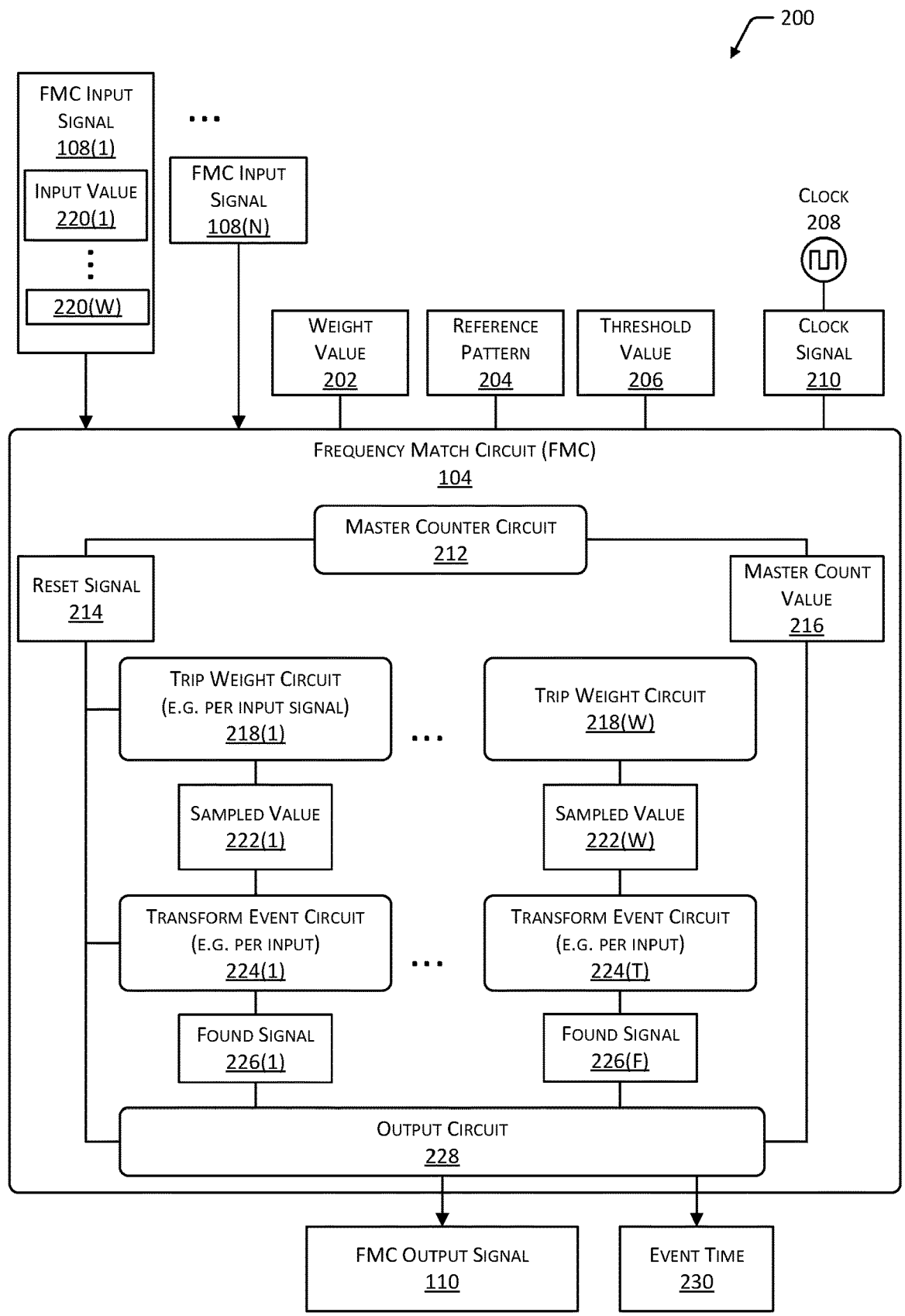
FIG. 2 is a block diagram of one implementation of a frequency match circuit which may include a master counter circuit, a trip weight circuit, a transform event circuit, and an output circuit.

FIG. 2 is a block diagram 200 of one implementation of a frequency match circuit 104. As described elsewhere, one or more FMC input signals 108(1), 108(2), . . . , 108(N) may be received by the FMC 104. As used in this disclosure, letters in parenthesis such as "(N)" indicate an integer value. In the following examples, various data bit lengths are specified by way of illustration and not as a limitation. For example, 8-bit counters are discussed, but it is understood that counters using other bit values such as 16 bits or 32 bits may be used.

The FMC 104 is configured to accept input including, but not limited to, one or more of weight value 202, reference pattern 204, threshold value 206, or a clock signal 210 as generated by a clock 208. In some implementations the clock 208 may comprise a system clock.

Figure 16:
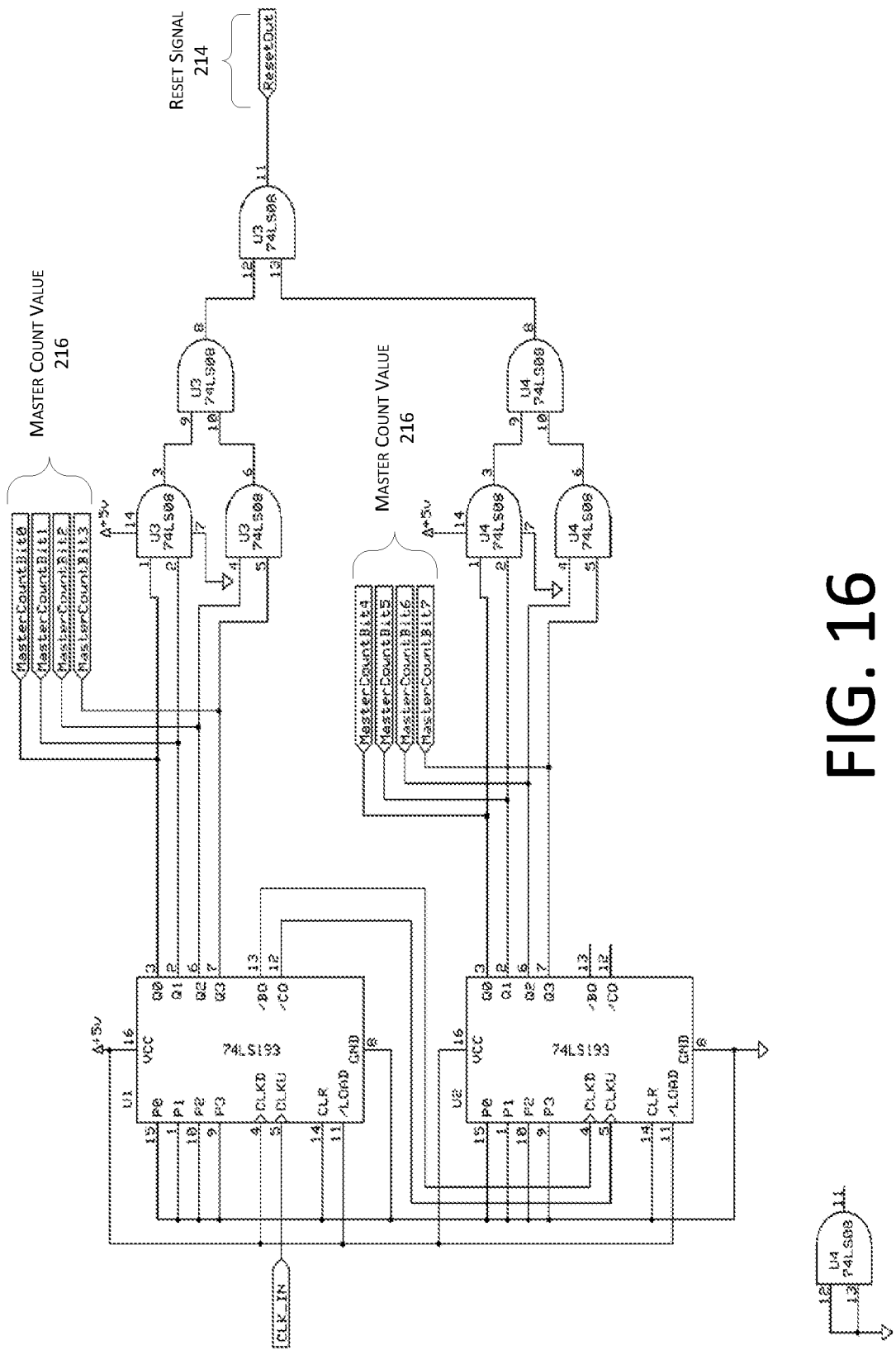
FIGS. 16-30 illustrate schematics of circuits for one implementation of digital data processing circuitry.

The FMC 104 may include a master counter circuit 212 that is configured to generate one or more of: a reset signal 214 (e.g. "ResetOut") or a master count value 216 (e.g. "MasterCountBit"). The reset signal 214 may be provided to other portions of the FMC 104 as described elsewhere. The master count value 216 is indicative of a count by the master counter circuit 212. In some implementations, the master count value 216 is indicative of time. One implementation of the master counter circuit 212 is depicted in FIG. 16.

The FMC 104 may include one or more trip weight circuits 218(1), 218(2), . . . , 218(W). In some implementations, one or more trip weight circuits 218 may be provided within the FMC 104 for each FMC input signal 108. The trip weight circuit 218 is configured to accept the reset signal 214. The trip weight circuit 218 may also be configured to accept the weight value 202. One implementation of the trip weight circuit 218 is depicted herein. For example, a trip weight circuit counter of the trip weight circuit 218 is depicted in FIGS. 17, 25, 27, and 29. A trip weight circuit input inverter is depicted in FIGS. 18, 26, 28, and 30.

The trip weight circuit 218 may operate as described herein to use an input value 220 (e.g. "DataIn") and the weight value 202 to generate a sampled value 222 (e.g. "TripOut"). For example, the input value 220 may comprise a particular bit of the FMC input signal 108.

The trip weight circuit 218 may provide the sampled value 222 to a transform event circuit (TEC) 224. The transform event circuit 224 may be configured to generate a found signal 226 (e.g. "FoundFlag") based at least in part on the sampled value 222 and the reference pattern 204. One implementation of the transform event circuit 224 is depicted in FIGS. 19, 22, 23, and 24.

In some implementations, each FMC input signal 108 may be provided to a separate trip weight circuit 218, which in turn is associated with a particular transform event circuit 224. For example, the FMC 104 may be configured to accept an FMC input signal 108 having four input values 220(1)-(4), each input value 220 representative of a bit. Each trip weight circuit 218 may then provide the sampled value 222 to a corresponding transform event circuit 224 for generation, when a match is determined, of the found signal 226.

Figure 20:
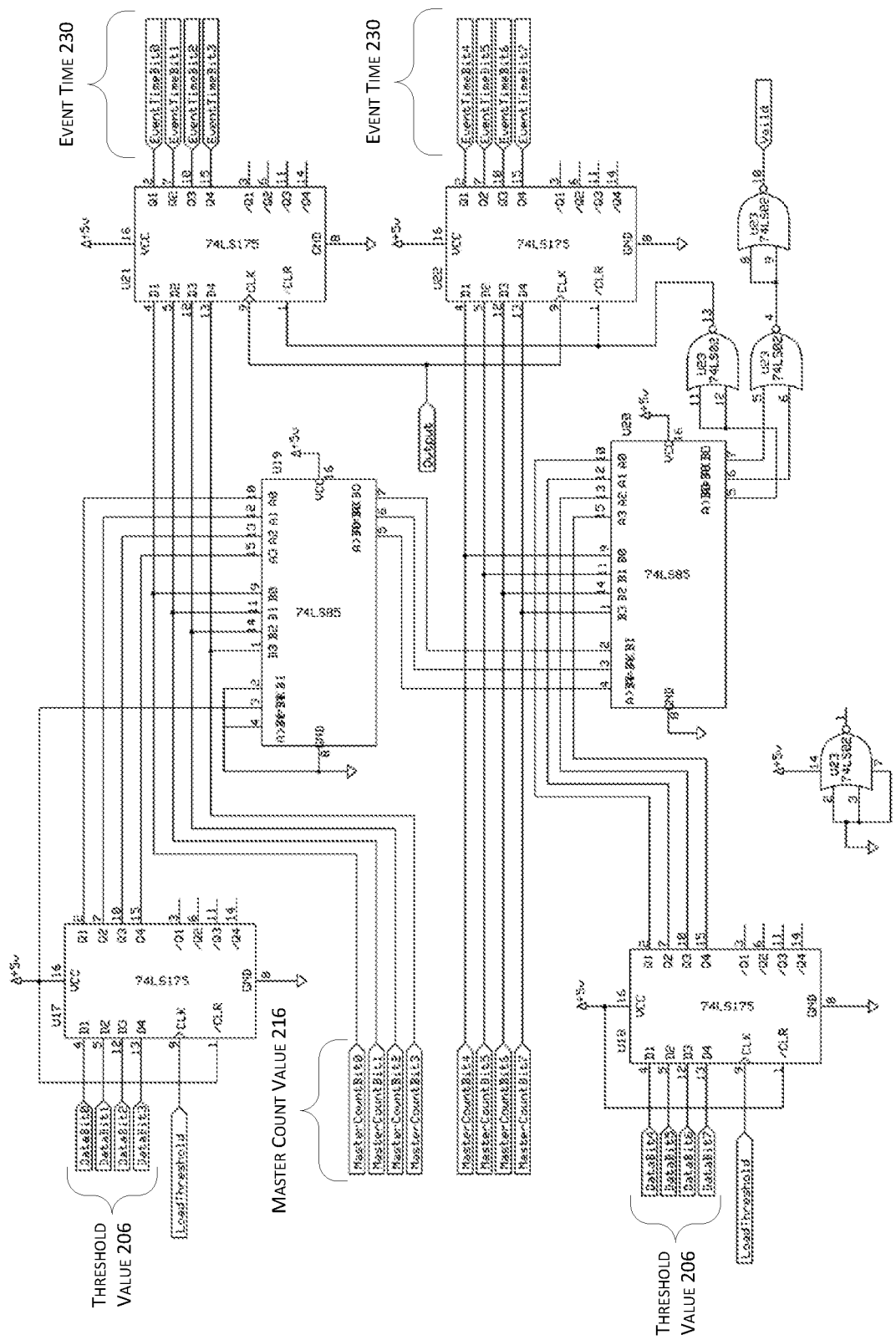

An output circuit 228 is configured to accept one or more found signals 226(1), 226(2), . . . , 226(F) as provided by the one or more transform event circuits 224(1), . . . , 224(T). The output circuit 228 is configured to generate the FMC output signal 110. As described elsewhere, in some implementations the FMC output signal 110 may be directed to one or more other FMCs 104 by way of one or more interconnections 106. Operation of the FMC 104 is discussed in more detail herein. In one implementation, the output circuit 228 may include an output circuit valid generator such as shown in FIG. 20 and an output circuit output generator shown in FIG. 21. The output circuit 228 may also determine an event time 230, indicative of when the sampled value matches the reference pattern.

Figure 3:
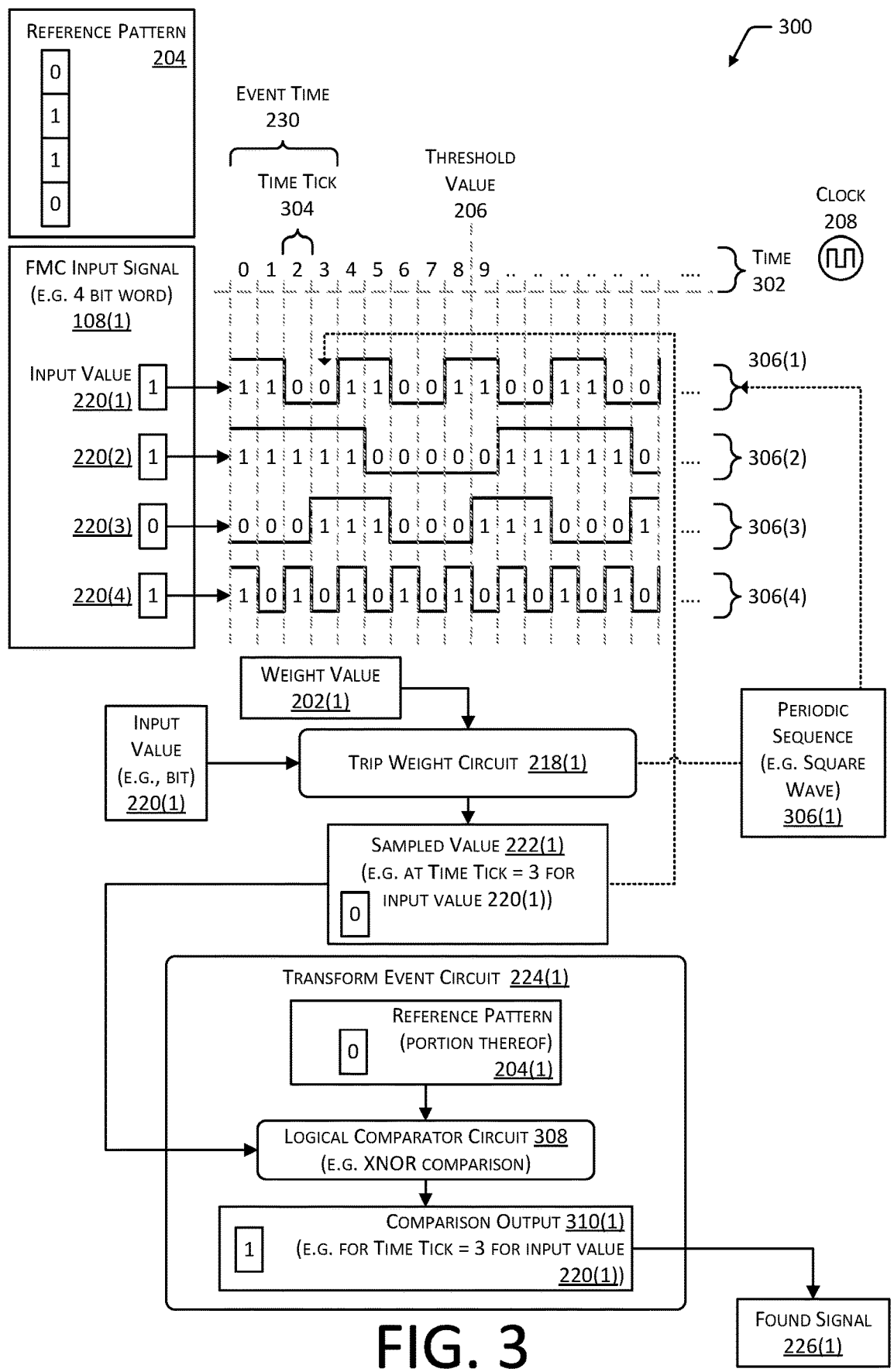
FIG. 3 is a block diagram of one implementation of the trip weight circuit and the transform event circuit.

FIG. 3 is a block diagram 300 of one implementation of the trip weight circuit 218 and the transform event circuit 224. As described above, the FMC input signal 108(1) may comprise input values 220. For example, in this diagram by way of illustration and not as a limitation, four input values 220(1)-(4) are depicted along with a corresponding four bit reference pattern 204. In one implementation depicted here, particular trip weight circuits 218 and transform event circuits 224 may process particular input values 220.

The trip weight circuit 218 accesses an input value 220 and a weight value 202. For example, the trip weight circuit 218(1) accepts as input the input value 220(1) and the weight value 202(1). In some implementations, each input value 220 may have an individual weight value 202 assigned thereto.

The trip weight circuit 218 may be configured to operate in coordination with other circuits in the system 100 by way of clock signals 210 from the clock 208. In this illustration a graph depicts time 302 increasing along a horizontal axis to the right, with time ticks 304 extending from time 0, 1, 2, 3, 4, and so forth.

The trip weight circuit 218 generates a periodic sequence 306 based at least in part on the input value 220 and the weight value 202. The periodic sequence 306 may be a time varying sequence that is a given value of the periodic sequence and may change as time 302 increases. In some implementations, the periodic sequence 306 may not vary with time, such as where the weight value 202 comprises a maximum. For example, where the weight value 202 in the 8-bit examples used herein is "255", the periodic sequence 306 may maintain a constant value over time. The periodic sequence 306 may be provided as a waveform such as a square wave, or data indicative of a waveform such as a sequence of binary values. The periodic sequence 306 may result from a product of the input value 220 and the weight value 202, such that a frequency of the periodic sequence 306 is proportionate to the weight value 202. For example, the periodic sequence 306(1) as produced by the trip weight circuit 218(1) has a frequency which corresponds to a weight value 202(1) of "2". In comparison, the trip weight circuit 218(2) may receive as input a weight value 202(2) of "5", resulting in the periodic sequence 306(2). When the FMC 104 is implemented in hardware such as a field programmable gate array, the periodic sequence 306 may be expressed as a time varying voltage which approximates a square wave having ramp up or ramp down times that result from non-instantaneous voltage transitions.

At various time ticks 304, the trip weight circuit 218 is configured to generate the sampled value 222. The trip weight circuit 218 may generate sampled values 222 at every time tick 304, at periodic time ticks 304, or upon demand. The sampled value 222 provides information about a value of the periodic sequence 306 at the particular time 302. For example, at time tick 304 of "3", the periodic sequence 306(1) produced by trip weight circuit 218(1) expresses a binary value of "0".

The trip weight circuit 218 provides the sampled value 222 to the transform event circuit 224. Continuing the example, the sampled value 222(1) of binary value "0" is provided to the transform event circuit 224(1). The transform event circuit 224 accesses a reference pattern 204, or a portion thereof. In this example, the transform event circuit 224(1) accesses the first bit of the reference pattern 204 that is indicative of a binary value "0". A logical comparator circuit 308 is configured to compare the sampled value 222 with the reference pattern 204. In one implementation, the logical comparator circuit 308 may comprise an XNOR operation that implements the following truth table:

Truth TABLE 1

| Input | | |
|---|---|---|
| A | B | Output |
| 0 | 0 | 1 |
| 0 | 1 | 0 |
| 1 | 0 | 0 |
| 1 | 1 | 1 |

The logical comparator circuit 308 generates comparison output 310. Continuing the example depicted here, given the sampled value 222(1) of "0" and the reference pattern 204(1) value of "0", based on the XNOR operation described in Truth Table 1, the comparison output 310(1) is a binary or logical value of "1", indicating a match. In other implementations the logical comparator circuit 308 may use other logical operations. For example, an XOR operation may be used to indicate a match with a binary or logical value of "1".

The comparison output 310 may be provided by the transform event circuit 224 as the found signal 226. In another implementation the found signal 226 may be generated responsive to the value of the comparison output 310. As time 302 progresses, and successive time ticks 304 take place, the sampled value 222 produced by the trip weight circuit 218, and a comparison output 310 may change as well.

In the illustration of FIG. 3, the sampled values 222 of the input values 220 matches the reference pattern 204. The time at which this match occurs is designated as the event time 230 as described above. In this illustration, the event time 230 is less than the threshold value 206. As described below in more detail, the output circuit 228 may generate an FMC output signal 110 given that the event time 230 is less than a threshold value 206. The threshold value 206 may be set as a result of prior training of the FMC 104 or the processing network 102. In some implementations the threshold value 206 may be static or may be dynamic.

Figure 4:
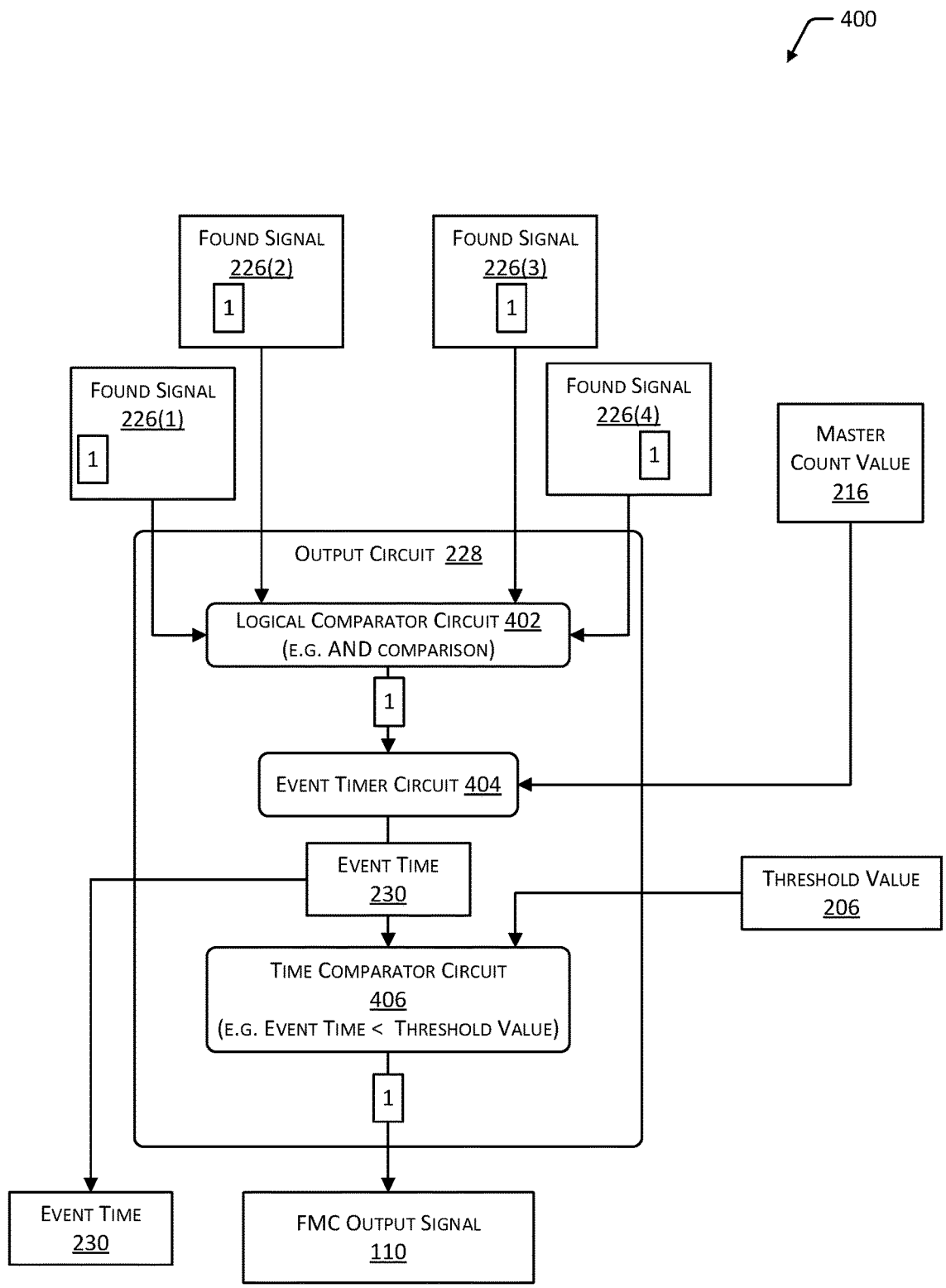
FIG. 4 is a block diagram of one implementation of the output circuit.

FIG. 4 is a block diagram 400 of one implementation of the output circuit 228. The output circuit 228 may be coupled to a plurality of transform event circuits 224. Continuing the example of FIG. 3, the output circuit 228 depicted here receives found signals 226(1)-(4) from the corresponding transform event circuits 224(1)-(4).

The output circuit 228 implements a logical comparator circuit 402. The logical comparator circuit 402 may implement an AND operation that implements the following truth table:

Truth TABLE 2

| Input | | |
|---|---|---|
| A | B | Output |
| 0 | 0 | 0 |
| 0 | 1 | 0 |
| 1 | 0 | 0 |
| 1 | 1 | 1 |

Upon a determination that all of the found signals 226 have been received, indicative of the sampled value 222 corresponding to the reference pattern 204, the logical comparator circuit 402 generates a binary or logical "1" indicating that a sufficient match between the FMC input signal 108 and the reference pattern 204 has been deemed to occur. Given the changing nature of the periodic sequence 306, this may or may not be an exact match between the FMC input signal 108 and the reference pattern 204.

The output circuit 228 may include, or be coupled to, an event timer circuit 404. The event timer circuit 404 is configured to access or otherwise utilize the master count value 216. Upon receiving an indication of detection of a match from the logical comparator circuit 402, the event timer circuit 404 generates the event time 230 data. In some implementations, the event timer circuit 404 may provide event time 230 data to other circuits or portions of the system.

The data indicative of the event time 230 may be provided to a time comparator circuit 406. The time comparator circuit 406 is configured to determine if the event time 230 is less than or equal to the threshold value 206. The time comparator circuit 406 may accept as inputs the event time 230 data and the threshold value 206. Upon a determination that the event time 230 is less than a threshold value 206, an FMC output signal 110 may be generated. For example, the FMC output signal 110 may comprise a binary or logical "1".

Figure 5:
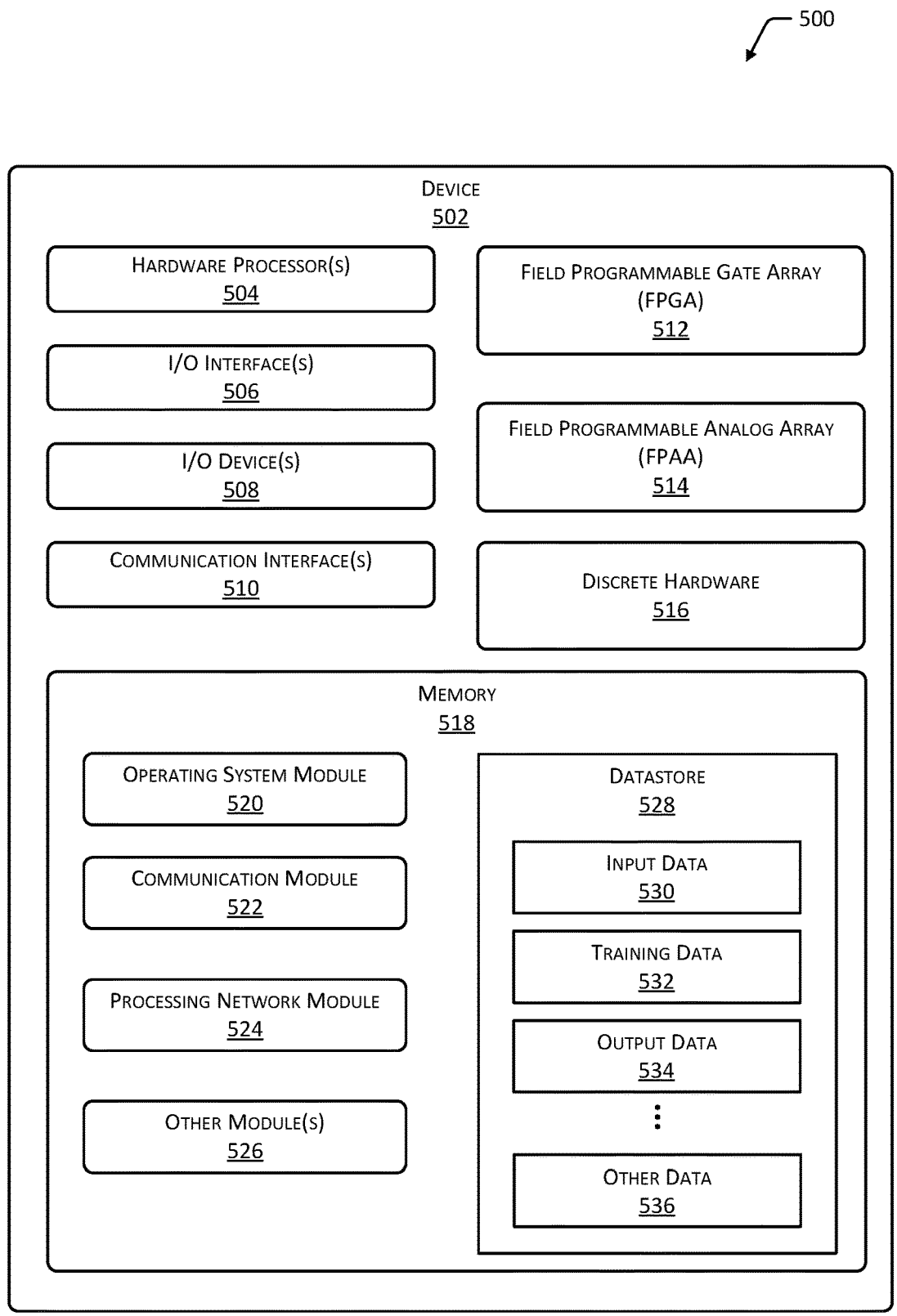
FIG. 5 is a block diagram of one implementation of a device configured to implement one or more frequency match circuits.

FIG. 5 illustrates a block diagram 500 of a device 502. The device 502 may include one or more hardware processors 504 ("processors") configured to execute one or more stored instructions. The processors 504 may comprise one or more cores. The device 502 may include one or more input/output ("I/O") interface(s) 506 to allow the processor 504 or other portions of the device 502 to communicate with other devices. The I/O interfaces 506 may comprise inter-integrated circuit ("I2C"), serial peripheral interface bus ("SPI"), Universal Serial Bus ("USB") as promulgated by the USB Implementers Forum, RS-232, and so forth.

The I/O interface(s) 506 may couple to one or more I/O devices 508. The I/O devices 508 may include input devices such as one or more of a camera, a microphone, a touch sensor, a button, ultrasonic rangefinder, strain gauge, temperature sensor, a magnetic sensor, accelerometer, gyroscope, magnetometer, and so forth. The I/O devices 508 may also include output devices such as one or more of a display, audio speakers, motors, lights, industrial process control devices, and so forth. In some embodiments, the I/O devices 508 may be physically incorporated with the device 502 or may be externally placed.

The device 502 may also include one or more communication interfaces 510. The communication interfaces 510 are configured to provide communications between the device 502 and other devices, such as other devices, routers, access points, servers, external sensors, and so forth. The communication interfaces 510 may be configured to couple wired or wirelessly to one or more local area networks, wide area networks, and so forth. For example, the communication interface 510 may be configured to couple to an Ethernet network.

The device 502 may also include one or more buses or other internal communications hardware or software that allow for the transfer of data between the various circuits and components of the device 502.

The device 502 may include one or more field programmable gate arrays ("FPGA") 512, one or more field programmable analog arrays 514, discrete hardware 516, or a combination thereof. For example, the FPGA may comprise a DE2-115 development board as produced by Terasic Technologies Inc. of Taiwan. In another example, discrete hardware 516 may include individual electronic components that are arranged into electronic circuits.

As shown in FIG. 5, the device 502 includes one or more memories 518. The memory 518 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 518 provides storage of computer readable instructions, data structures, program circuits, and other data for the operation of the device 502.

In some implementations, the memory 518 may include at least one operating system ("OS") module 520. The OS module 520 is configured to manage hardware resource devices such as the I/O interfaces 506, the I/O devices 508, the communication interfaces 510, and provide various services to applications or modules executing on the processors 502. The OS module 520 may implement a variation of the Linux operating system, the FreeBSD operating system, the iOS operating system from Apple, Inc. of Cupertino, Calif., the Windows operating system from Microsoft Corporation of Redmond, Wash., the LynxOS from LynxWorks of San Jose, Calif., and so forth.

Also stored in the memory 518 may be one or more of the following modules. These modules may be executed as foreground applications, background tasks, daemons, and so forth.

A communication module 522 may be configured to establish communication using the one or more communication interfaces 510 with devices external to the device 502. For example, in some implementations the communication module 522 may implement a transmission control protocol/Internet protocol stack.

A processing network module 524 is configured to implement the processing network 102 using a functional equivalent of one or more of the frequency match circuits 104, as implemented by instructions executing on one or more processors 504. For example, the processing network module 524 may be configured to implement the FMC 104 and associated circuits by execution of the exemplary Java program code shown below. In other implementations the processing network module 524 may be implemented using other programming languages. For example, the processing network module 524 may be written using C, C++, C#, Python, Perl, and so forth.

See Example Code 1 in the Computer Program Listing Appendix.

In some implementations, the processing network module 524 may execute at least in part on the hardware processor 504. In other implementations, the processing network module 524 may execute at least in part using other hardware, such as the FPGA 512, the FPAA 514, the discrete hardware 516, and so forth. For example, one implementation of discrete hardware 516 is depicted below with regard to FIGS. 16-30.

Other modules 526 may also be stored in the memory 518. For example, the other modules 526 may include a training module configured to train the processing network 102, generate weight values 202, and so forth.

The memory 518 may also include a datastore 528 to store information. The datastore 528 may use a flat file, database, linked list, tree, executable code, script, or other data structure to store the information. In some implementations, the datastore 528 or a portion of the datastore 528 may be distributed across one or more other devices. The data store 528 may be configured to store input data 530. For example, the input data 530 may include image data, temperature data, motor control data, or other information for processing at least in part by the processing network 102.

The data store 528 may also store training data 532 used to train the processing network 102. For example, the training data 532 may include one or more of the weight value 202, the reference pattern 204, threshold value 206, and so forth. In some implementations, the processing network 102 may be trained in a supervised or unsupervised fashion.

The data store 528 may also store output data 534. The output data 534 may be indicative of one or more of the FMC output signals 110. Other data 536 may also be stored in the data store 528. For example, the other data 538 may include other information associated with configuration or operation of the processing network 102. For example, Verilog code used to configure the FPGA 512 may be stored in the datastore 528.

Figure 6:
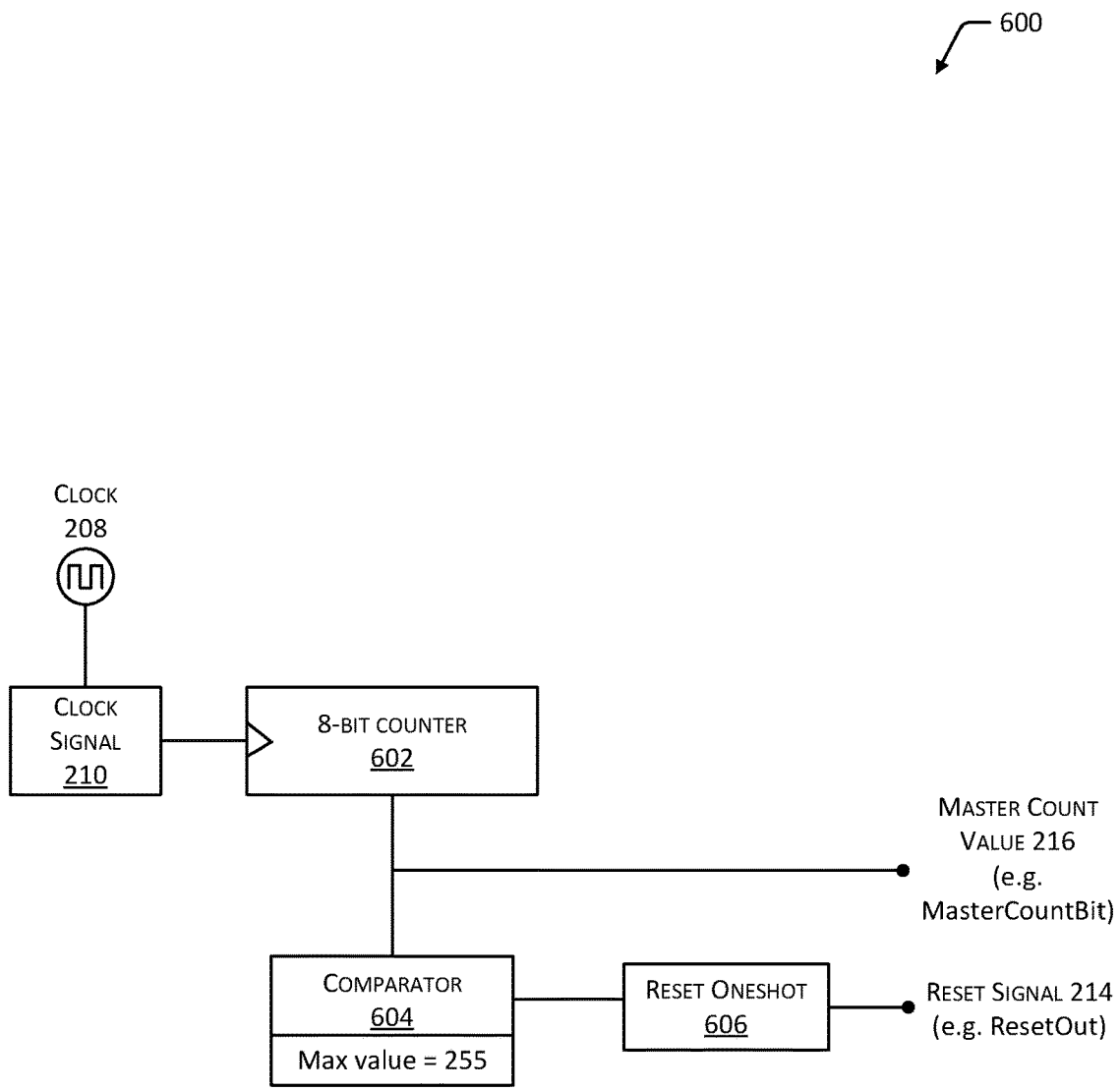
FIG. 6 is a schematic of one implementation of the master counter circuit.

FIG. 6 is a schematic 600 of one implementation of the master counter circuit 212. This implementation may be expressed by programming an FPGA 512, programming an FPAA 514, by discrete hardware 516, and so forth. While the following examples are shown with regard to 8-bit counters, it is understood that various bit lengths may be used.

The clock 208 provides the clock signal 210 to an 8-bit counter 602. For example, 602 may comprise a 74LS193 4-bit up/down counter. The 8-bit counter 602 provides a master account value 216 as an output. The master count value 216 may be provided to a comparator 604. The comparator 604 is used to reset the master counter circuit 212 after reaching a threshold maximum value. For example, the comparator 604 may comprise two 74LS85 4-bit magnitude comparators. For example, the comparator 604 has a maximum value of 255, such that when the master count value 216 reaches the value of 255, a signal is provided to a reset one shot 606. The reset one shot 606 may provide the reset signal 214.

Figure 17:
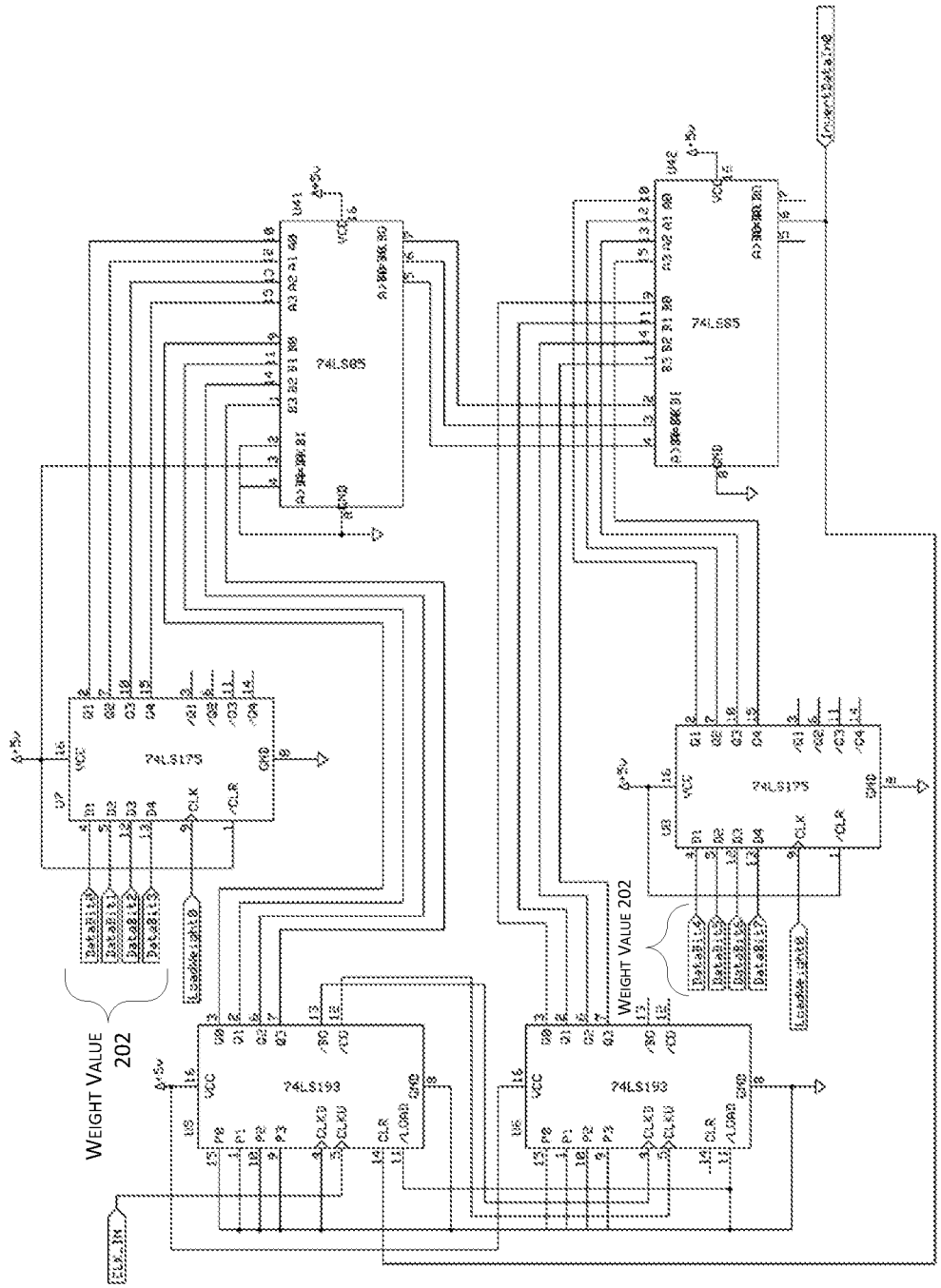

Additional details of the circuitry are presented in FIG. 17.

Figure 7:
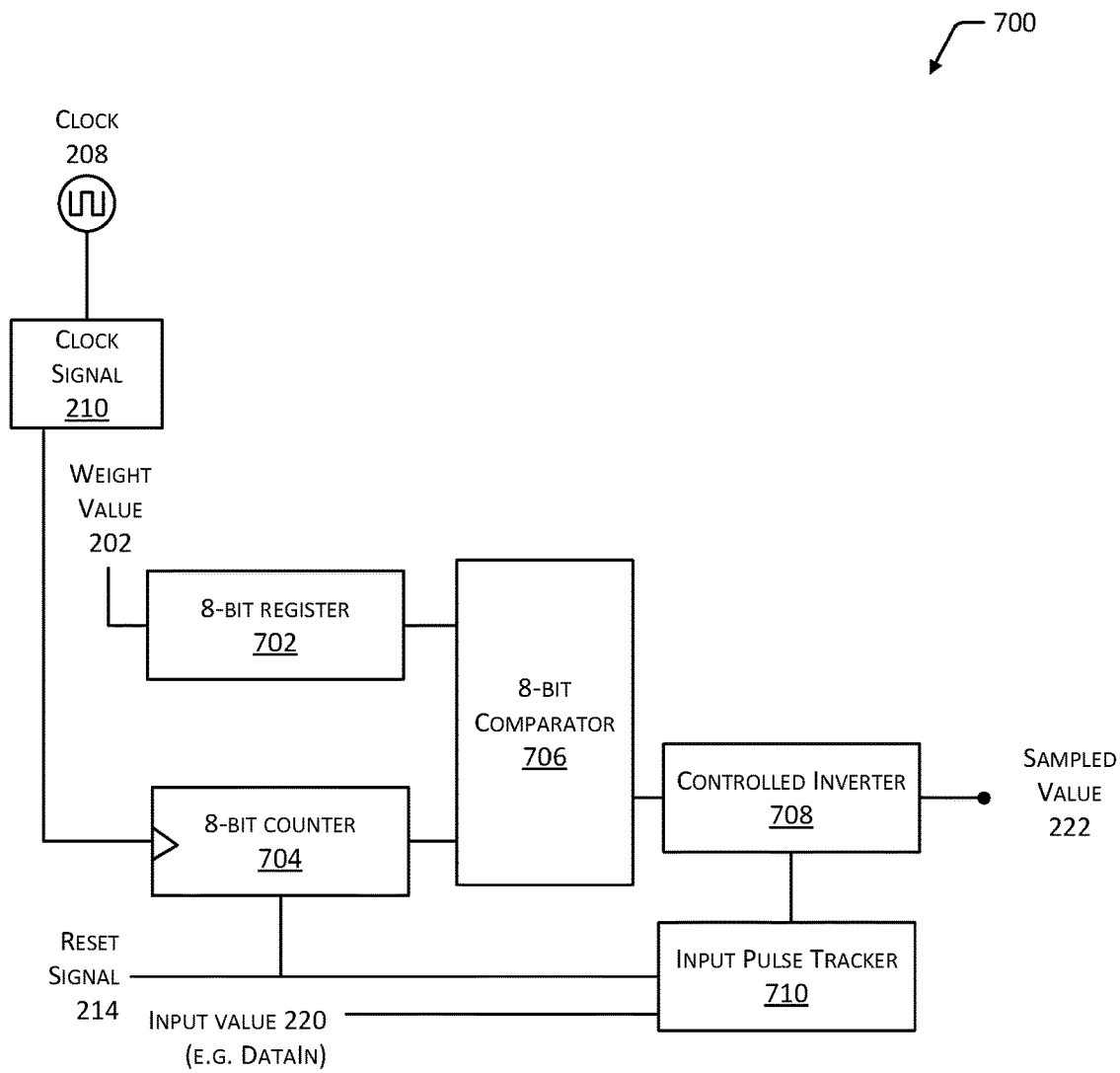
FIG. 7 is a schematic of one implementation of the trip weight circuit.

FIG. 7 is a schematic 700 of one implementation of the trip weight circuit 218. The weight value 202 is provided to an 8-bit register 702. The 8-bit register 702 may store the 8-bit weight value 202. In one implementation, the 8-bit register 702 may comprise 74LS175 quad D flip flops.

The clock 208 provides the clock signal 210 to an 8-bit counter 704. An 8-bit comparator 706 is configured to access the weight value 202 stored in the 8-bit register 702 and the value of the 8-bit counter 704. In one implementation, the 8-bit counter 704 may comprise 74LS193 4-bit up/down counters. Output from the 8-bit comparator 706 is provided to a controlled inverter 708. In one implementation, the 8-bit comparator 706 may comprise 74LS32 quad 2 input OR gates. The controlled inverter 708 receives input from an input pulse tracker 710. In one implementation, the controlled inverter 708 may comprise 74LS74 dual D flip flops. Responsive to the input from the 8-bit comparator 706 and the input pulse tracker 710, the controlled inverter 708 generates the sampled value 222.

The input pulse tracker 710 is configured to accept an input value 220 and store this value. In one implementation, the input pulse tracker 710 may comprise one or more of 72LS08 quad 2 input AND gates, 74LS02 quad 2 input NOR gates, or 74LS04 hex inverters. The input pulse tracker 710 may also be responsive to changes in the input value 220, such as when the input value 220 changes from a logical "0" to logical "1" overtime. The input pulse tracker 710 may be configured to use the original input value 220 or the changed input value 220. In some implementations the input pulse tracker 710 may be omitted, and the input value 220 may be provided directly to the controlled inverter 708.

The 8-bit counter 704 and the input pulse tracker 710 may be configured to receive the reset signal 214. Upon receipt of the reset signal 214, the 8-bit counter 704 may be configured to reset to a predetermined value, such as all zeros. Upon receipt of the reset signal 214, the input pulse tracker 710 may be configured to switch to use a more recently received input value 220, clear the currently stored input value 220, or take other action.

The 8-bit comparator 706 may be used to compare the current value of the 8-bit counter 704 with the weight value 202 stored in the 8-bit register 702. If the two are equal, the 8-bit comparator 706 output changes from a 0 to a 1. While the 8-bit counter 704 is counting up from zero and the value of the weight is still greater than the count value, the comparator output is 0. When the count value is equal to the weight, the comparator output changes to a 1 and remains at that value until the 8-bit counter 704 is reset.

The output of the 8-bit comparator 706 is provided to the controlled inverter 708. The controlled inverter 708 inverts its output when the signal from the 8-bit comparator 706 changes to a logical 1.

In some implementations, the 8-bit counter 704 may count on a rising edge of a pulse of the clock signal 210 provided by the clock 208. The 8-bit comparator 706 and the controlled inverter 708 may change their outputs responsive to receipt of the rising edge. In some implementations, a gate delay may be present.

Figure 18:
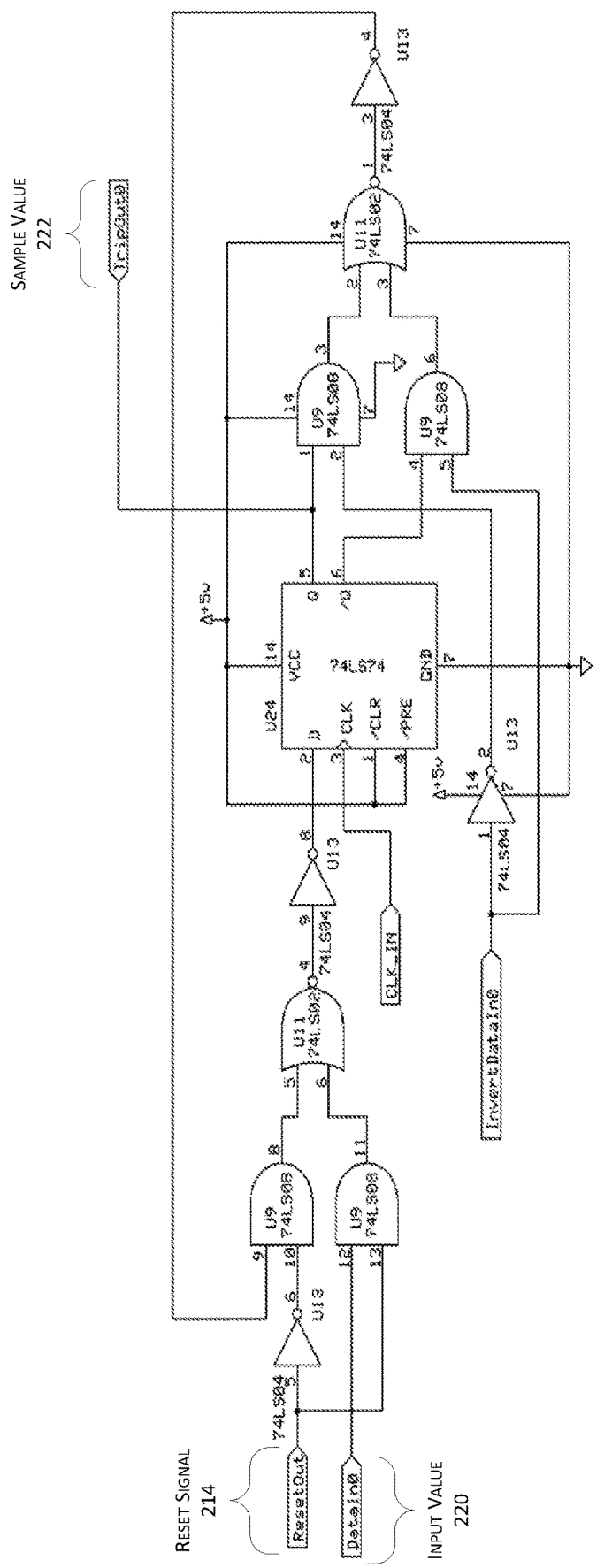
Figure 18:

Additional details of the circuitry are presented in FIG. 18.

Figure 8:
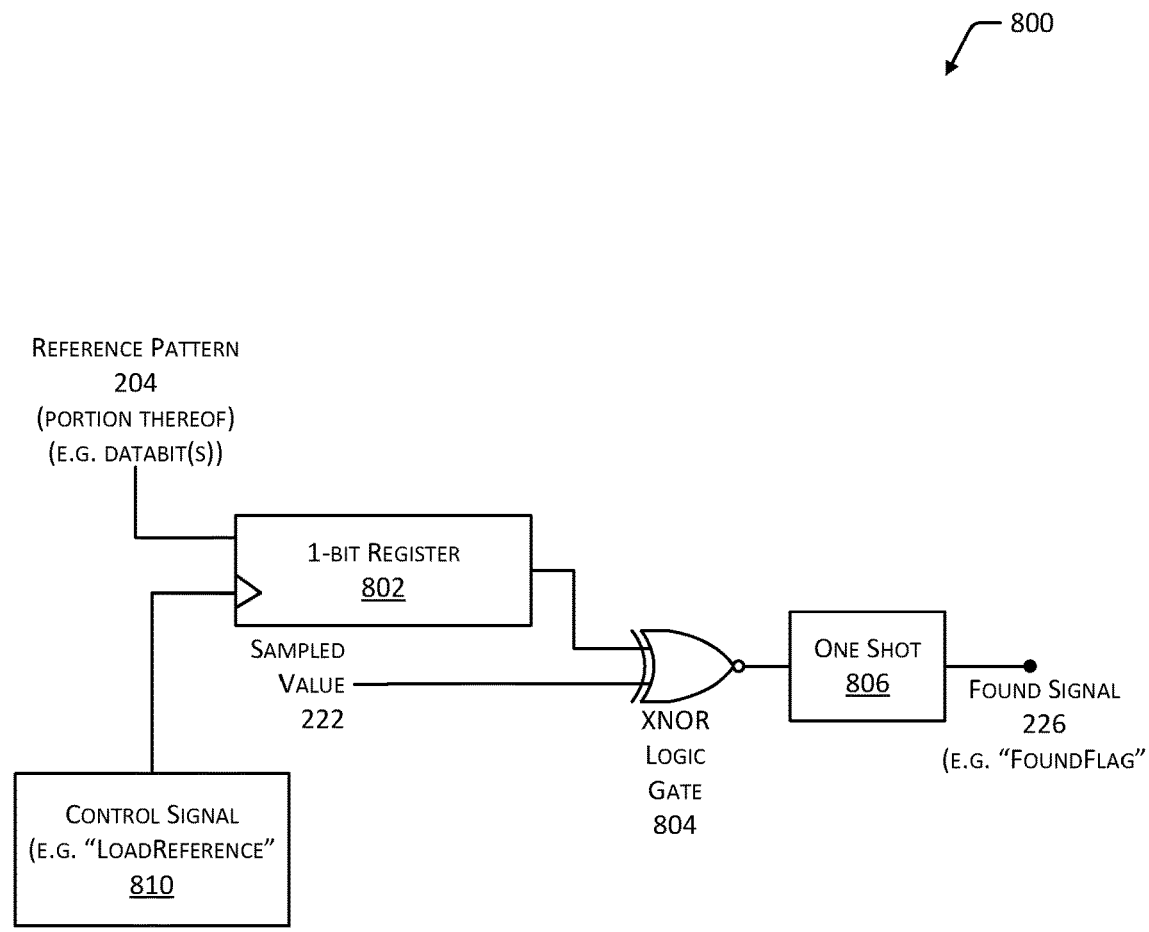
FIG. 8 is a schematic of one implementation of the transform event circuit.

FIG. 8 is a schematic 800 of one implementation of the transform event circuit 224. The reference pattern 204 (or a portion thereof, such as a single bit) and a control signal 810 ("LoadReference") are provided to a 1-bit register 802. In one implementation, the 1-bit register 802 may comprise 74LS74 dual D flip flops. In some implementations, a load signal may be used to store the value of the reference pattern 204. The load signal and the clock signal 210 may be delivered contemporaneously. In some implementations, the control signal 810 may be based at least in part on, or may comprise, the clock signal 210 from the clock 208.

Output from the 1-bit register 802 and the sampled value 222 are provided to a two-input XNOR logic gate 804, or equivalent. For example, 804 may comprise a CD4077 quad 2 input XNOR gate. As described above, the sampled value 222 may be the output of the trip weight circuit 218. Output from the XNOR logic gate 804 is provided to a one shot 806 device, which when triggered by an output from the XOR logic gate 804 generates the found signal 226 ("Found-Flag"). The one shot 806 device may be configured to provide an output signal of particular duration. In one implementation, the one shot 806 device may comprise 74LS74 dual D flip flops.

Figure 9:
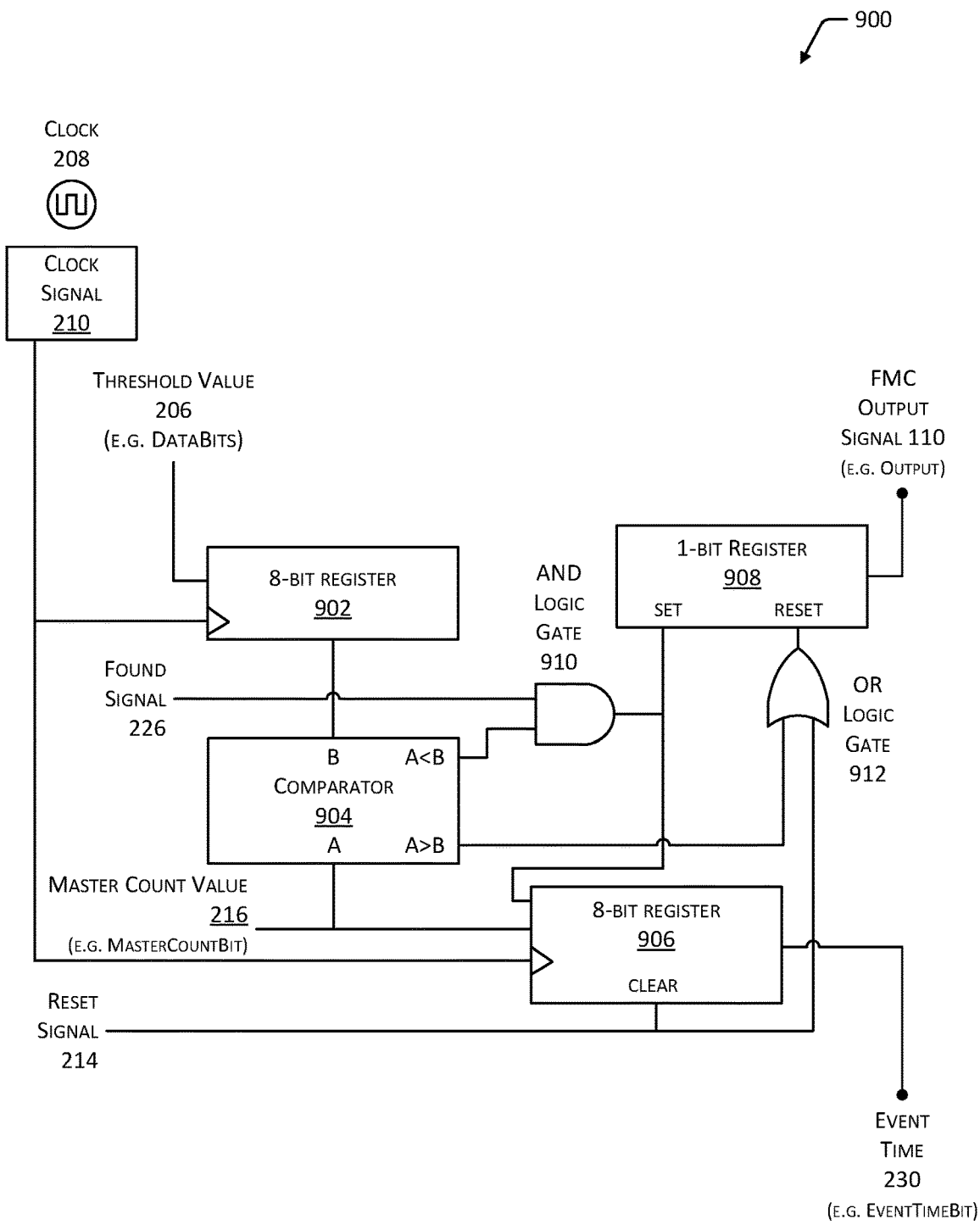
FIG. 9 is a schematic of one implementation of the output circuit.

FIG. 9 is a schematic 900 of one implementation of the output circuit 228. The output circuit 228 may comprise an 8-bit register 902, a comparator 904, another 8-bit register 906, a 1-bit register 908, an AND logic gate 910, and an OR logic gate 912. The clock 208 provides the clock signal 210 to the 8-bit register 902 and the 8-bit register 906. The threshold value 206 is provided as an input to the 8-bit register 902 which provides an output to the comparator 904 at a "B" input. In one implementation, the 8-bit register 902 may comprise 74LS175 quad D flip flops. The comparator 904 also receives the master count value 216 at an "A" input. The comparator 904 is configured to determine when A<B or when A>B, where "A" is indicative of the master count value 216 and "B" is indicative of the threshold value 206. In one implementation, the comparator 904 may comprise a 74LS85 4-bit magnitude comparator.

The found signal 226 as well as the output from the comparator 904 of A<B are provided to the AND logic gate 910 as inputs. Output from the AND logic gate 910 is provided to a set input of the 1-bit register 908. In one implementation, the AND logic gate 910 may comprise 74LS08 quad 2 input AND gates. In one implementation, the 1-bit register 908 may comprise 74LS74 dual D flip flops.

Output from the comparator 904 of A>B and the reset signal 214 are provided to the OR logic gate 912. In one implementation, the OR logic gate 912 may comprise 74LS02 quad 2 input NOR gates. Output from the OR logic gate 912 is provided to a reset input of the 1-bit register 908. The 8-bit register 906 receives the reset signal 214 at a clear input. The 8-bit register 906 may generate an output and provide this output to the set input of the 1-bit register 908. The 8-bit register 906 may generate the event time 230 as an output. In one implementation, the 8-bit register 906 may comprise 74LS74 dual D flip flops.

Figure 21:
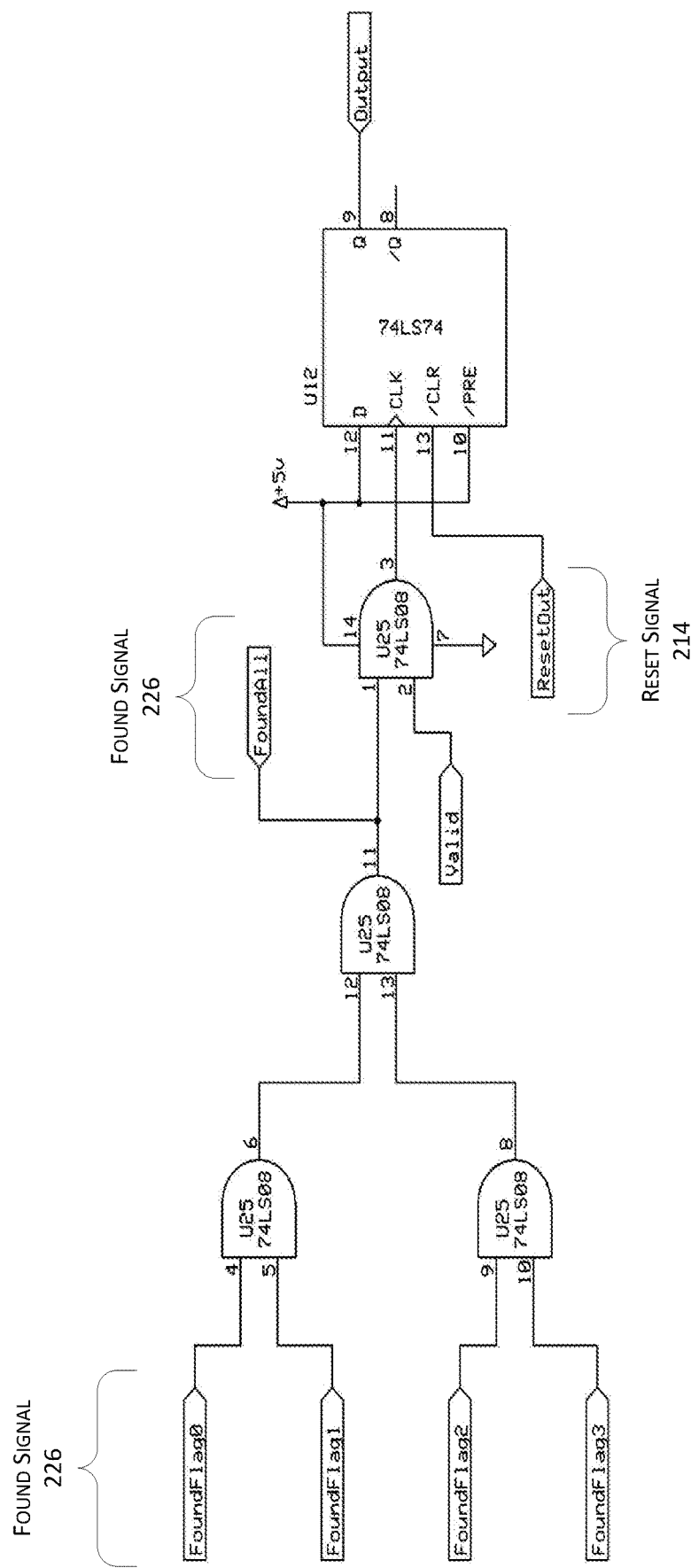

The 1-bit register 908, responsive to the set value as received from the AND logic gate 910 or the 8-bit register 906, and subject to a reset from the OR logic gate 912, generates the FMC output signal 110 (see "Output" in FIG. 21).

Figure 10:
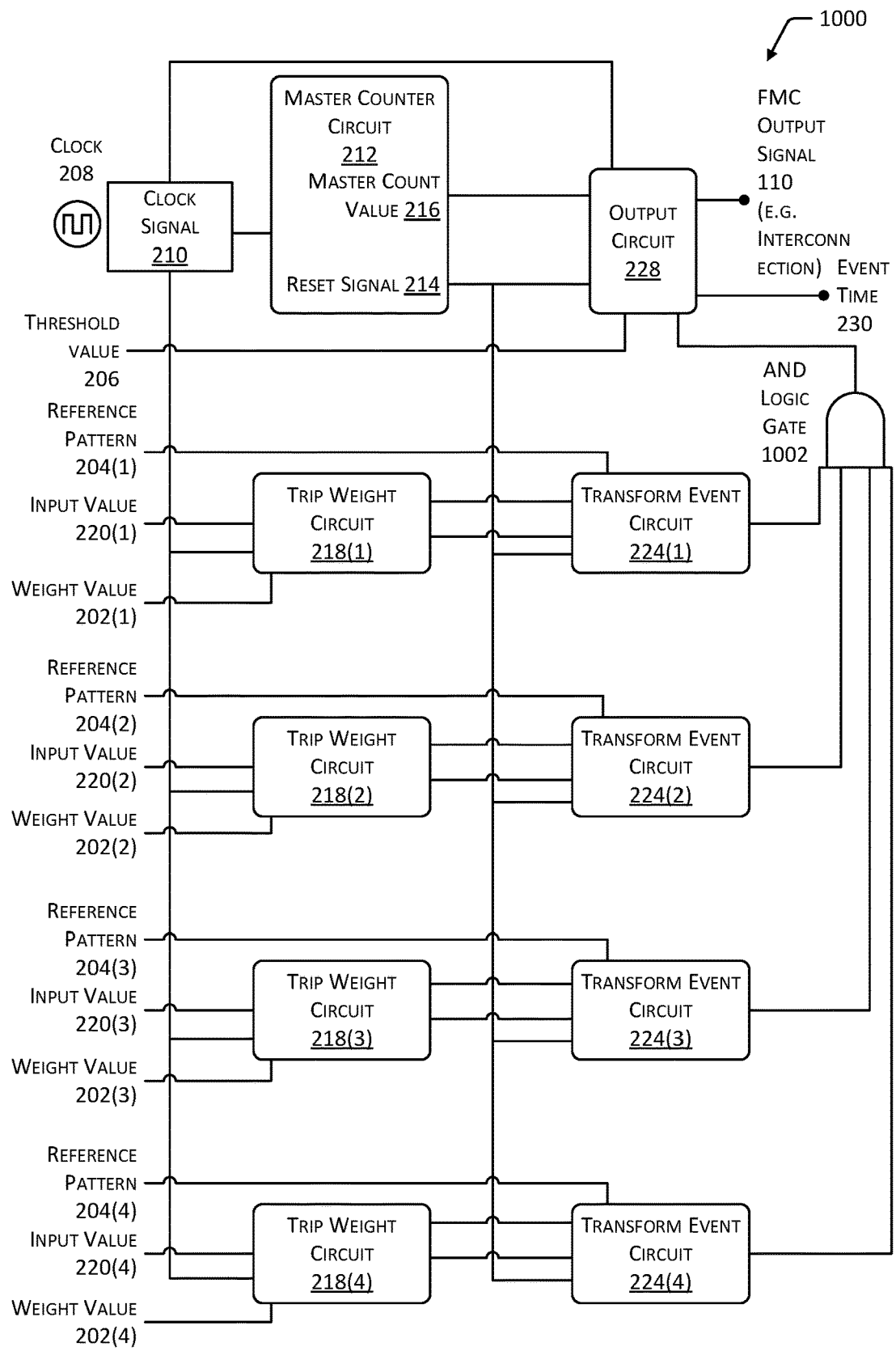
FIG. 10 is a schematic of one implementation of the frequency match circuit.

FIG. 10 is a schematic 1000 of one implementation of the frequency match circuit 104. In this illustration the clock 208 provides the clock signal 210 or derivative clock signals therefrom to the master counter circuit 212, the trip weight circuits 218, and the output circuit 228. As described above, the master counter circuit 212 generates the master count of value 216 and the reset signal 214. The trip weight circuits 218 accept input values 220 and the weight values 202, providing output to transform event circuits 224. The transform event circuits 224 generate found signals 226. The found signals 226 may be provided to an AND logic gate 1002. The output from the AND logic gate 1002 may be provided to the output circuit 228 as the found signal 226. As described above, the output circuit 228 may generate the FMC output signal 110 and the event time 230 data.

In implementations using an FPGA 512, the following Verilog code may be used to construct the FMC 104.

See Verilog Code 1 in the Computer Program Listing Appendix.

Figure 11:
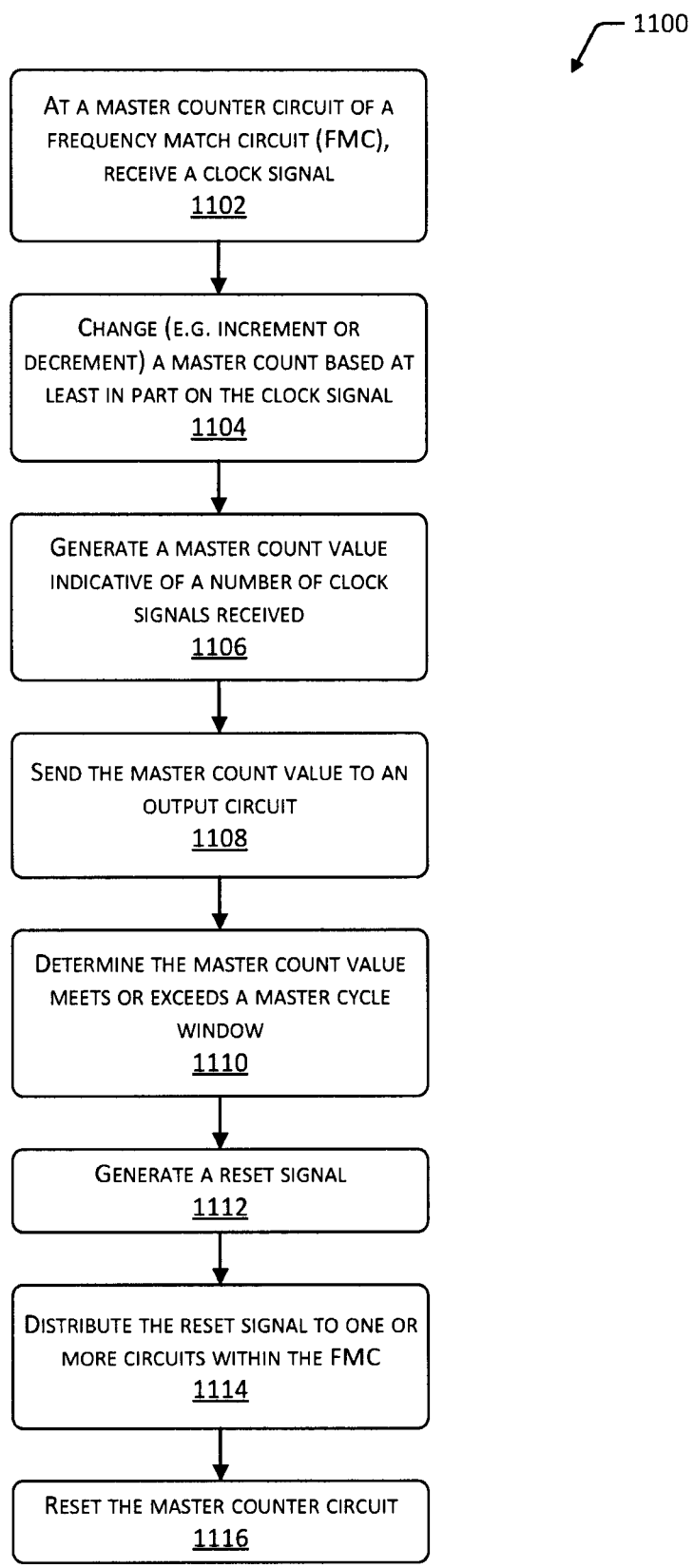
FIG. 11 illustrates a flow diagram of a process of the master counter circuit in operation.

FIG. 11 illustrates a flow diagram 1100 of a process of the master counter circuit 212 in operation. As described elsewhere, in some implementations, the master counter circuit 212 may be implemented as discrete hardware 516, programmable hardware, analog circuitry, or as instructions executing on a hardware processor 504.

At a master counter circuit 212 of a frequency match circuit 104, block 1102 receives a clock signal 210.

Block 1104 changes the master count value 216 of the master counter circuit 212 based at least in part on the clock signal 210. This change may include an increment, decrement, or other change to the mater count value 216. In one implementation, the master counter circuit 212 may increment by one bit the value of the master count value 216 subsequent to receipt of at least a portion of the clock signal 210 from the clock 208. In some implementations, the master counter circuit 212 may be configured to implement an 8-bit counter configurable to express values ranging from 0 to 255.

In some implementations, the changes to the master counter value 216 may be sequential integer values "1, 2, 3, . . . ", binary equivalents thereof, and so forth. In other implementations, the changes to the master count value 216 may involve skipping values, such as changing the master count value 216 on every third clock signal 210.

In some implementations the master counter circuit 212 may be internal to the particular FMC 104. For example, the master count value 216 in the FMC 104(1) may be the binary equivalent of decimal "234" while the master count value 216 in the FMC 104(2) may be the binary equivalent of decimal "225".

Block 1106 generates a master count value 216. The master count value 216 is indicative of a number of clock signals 210 received since initialization or previous reset of the master counter circuit 212. For example, the reset signal 214 may reset the value of the master count value 216 to zero.

Block 1108 sends or otherwise provides the master count value 216 to the output circuit 228. For example, the sending may comprise placing a voltage above a threshold value on a particular line into the output circuit 228. In another example, the providing may comprise storing a value at a memory location within CRSM.

Block 1110 determines the master count value 216 meets or exceeds a master cycle window. For example, with regard to an 8-bit counter, the master cycle window may comprise a value of 255. In some implementations, the master cycle window may be considered an expression of the duration of time from t to tmax in terms of increments or bit count. In some implementations, the master counter circuit 212 may not run for the entire length of the master cycle window. For example, the timing may be truncated. Furthermore, in some implementations, the master cycle window may differ between FMC's 104 in the same processing network 102. For example, the FMC 104(1) may use an 8-bit value in the master counter circuit 212(1), while the FMC 104(2) may use a master counter circuit 212(2) which counts using seven bits.

Block 1112 generates the reset signal 216. In some implementations, generation of the reset signal 216 may be based at least in part on the determination that the master count value 216 has met or exceeded the maximum count, such as the maximum time designated by the master cycle window.

Block 1114 distributes the reset signal 214 to one or more circuits within the FMC 102. For example, the master counter circuit 212 may distribute the reset signal 214 by placing a voltage above a threshold value to one or more lines of one or more of the trip weight circuits 218, the transform event circuits 224, or the master counter circuit 212 itself.

Block 1116 resets the master counter circuit 212. For example, the reset may comprise setting the master count value 216 to zero. The master counter circuit 212 may proceed to block 1104. The master counter circuit 212 may thus provide timing information and the reset signal 214 to coordinate operation of the elements of the FMC 104. In some implementations a single master counter circuit 212 may provide the master count value 216 to a plurality of FMCs 104.

Figure 12:
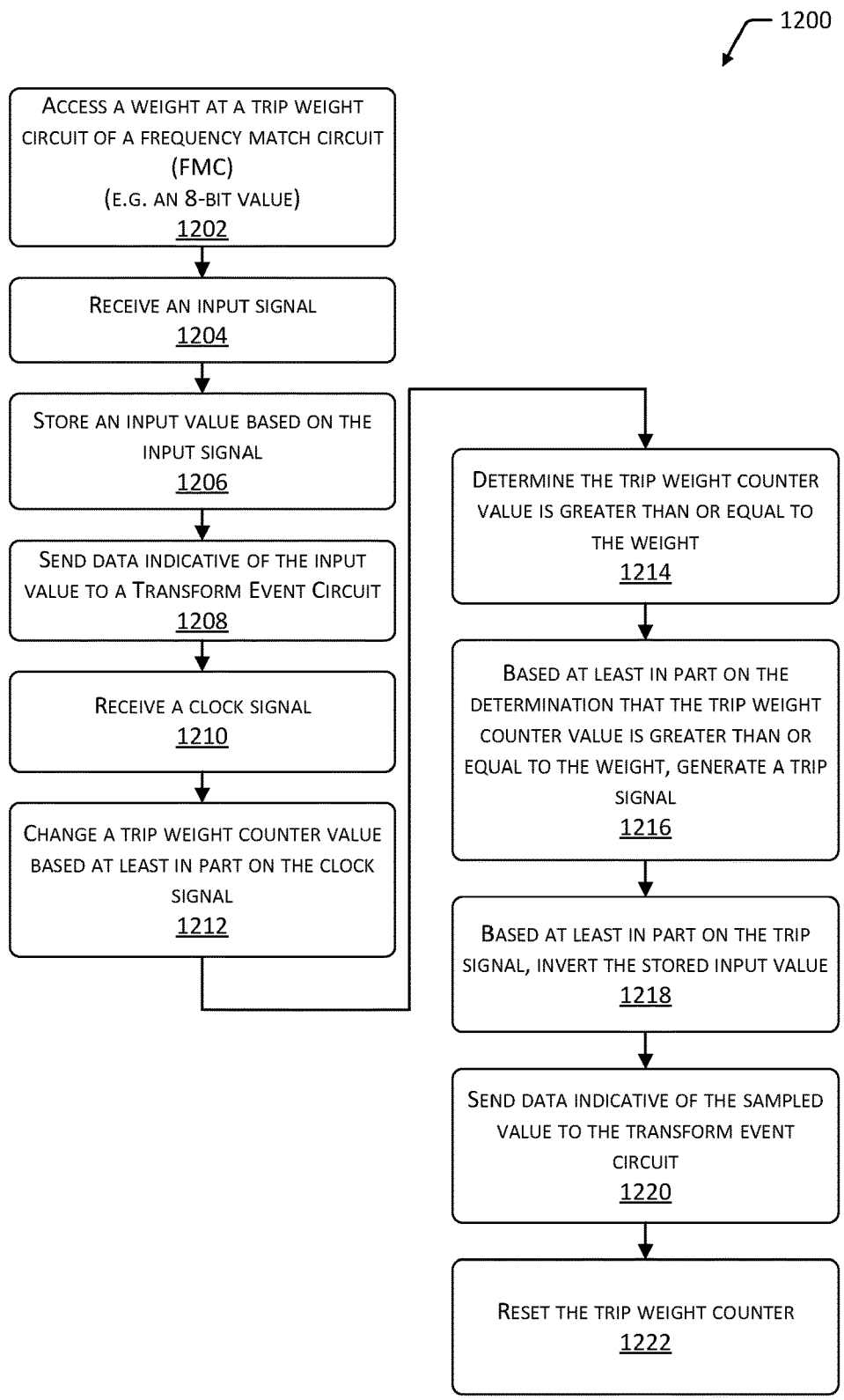
FIG. 12 illustrates a flow diagram of a process of the trip weight circuit in operation.

FIG. 12 illustrates a flow diagram 1200 of a process of the trip weight circuit 218 in operation. As described elsewhere, in some implementations, the trip weight circuit 218 may be implemented as discrete hardware 516, programmable hardware, analog circuitry, or as instructions executing on a hardware processor 504.

Block 1202 accesses a weight value 202 at a trip weight circuit 218 of an FMC 104. In one implementation the weight value 202 may comprise an 8-bit value. In some implementations, each trip weight circuit 218 may act on a single bit of the input data, such as the input value 220 of the FMC input signal 108.

Block 1204 receives an FMC input signal 108.

Block 1206 stores an input value 220 based on the FMC input signal 108. In one implementation where the trip weight circuit 218 is configured to process a single bit, the input value 220 may be stored using a flip-flop circuit, register, and so forth. For example, the input value 220 may express a value of the FMC input signal 108 at a particular moment in time at which the input value 220 was stored.

Block 1208 sends data indicative of the input value 220 to one or more transform event circuits 224. For example, a particular input value 220 indicative of a bit of the FMC input signal 108 may be provided to a particular transform event circuit 224.

Block 1210 receives a clock signal 210.

Block 1212 changes a trip weight counter value based at least in part on the clock signal 210. In some implementations, a bit length of the weight value 202 and the trip weight counter may be the same.

Block 1214 determines the trip weight counter value is greater than or equal to the weight value 202.

Based at least in part on the determination that the trip weight counter value is greater than or equal to the weight, block 1216 generates a trip signal.

Based at least in part on the trip signal, the stored input value 220 is inverted by block 1218 to generate the sampled value 222. For example, in one implementation a binary inverter may be used to generate the sampled value 222 based on the input value 220.

Block 1220 sends data indicative of the sampled value 222 to the transform event circuit 224. In some implementations, the output of the trip weight circuit 218 may be a time-varying periodic sequence such as a substantially square wave, with the frequency of the square wave dependent on the weight value 202 and the input value 220.

Block 1222 resets the trip weight counter. In some implementations, the weight value 202 and the input value 220 may remain at the previously used values after the reset. For example, the trip weight circuit 218 may retain the weight value 202 and the input value 220.

Figure 13:
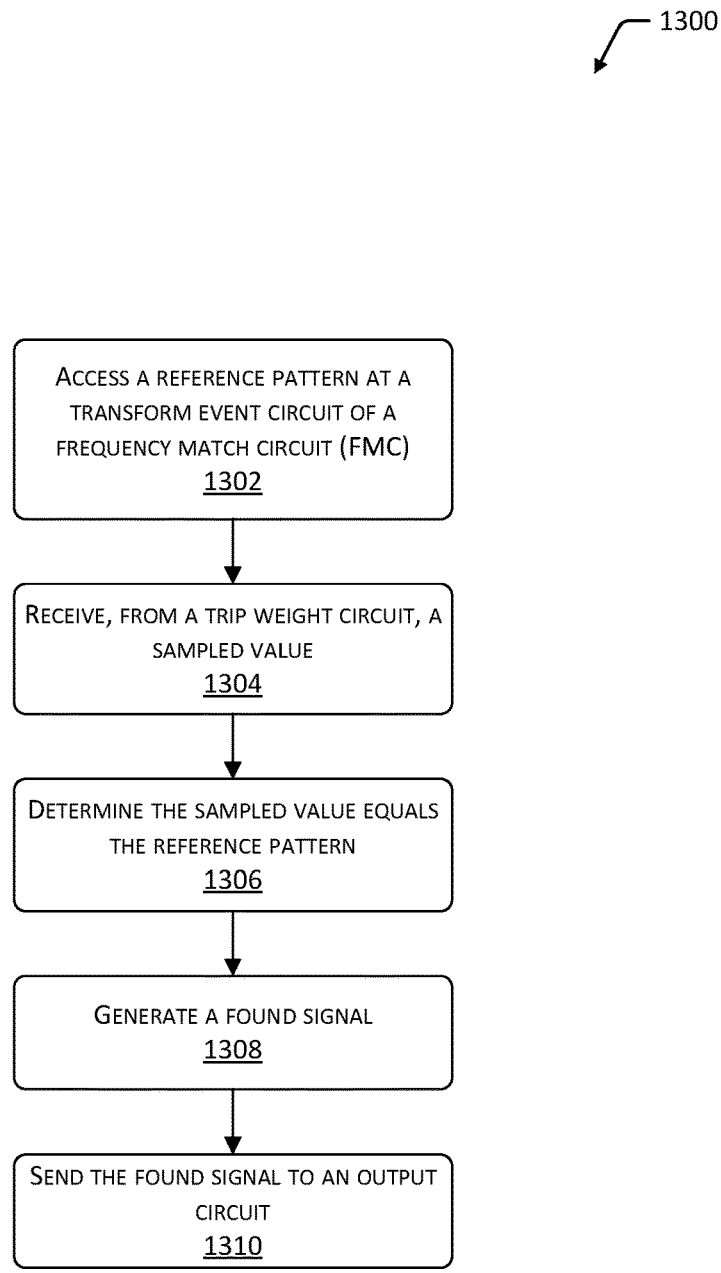
FIG. 13 illustrates a flow diagram of a process of the transform event circuit in operation.

FIG. 13 illustrates a flow diagram 1300 of a process of the transform event circuit 224 in operation. As described elsewhere, in some implementations, the transform event circuit 224 may be implemented as discrete hardware 516, programmable hardware, analog circuitry, or as instructions executing on a hardware processor 504.

Block 1302 accesses a reference pattern 204 accessible to the transform event circuit 224 of the FMC 104. For example, the reference pattern 204 may result from values provided during training of the processing network 102.

Block 1304 receives, from the trip weight circuit 218 the sampled value 222. In some implementations, the sampled value 222 may change over time. For example, depending upon when the periodic sequence 306 is sampled, the sampled value 222 may vary.

Block 1306 determines the sampled value 222 matches the reference pattern 204. In some implementations, the match may comprise a determination that the sampled value 222 and the reference pattern 204 are within a threshold level of one another.

Block 1308 generates a found signal 226 based at least in part on the determination that the input value 220 matches the reference pattern 204. In some implementations the found signal 226 may change over time. This change over time may be based at least in part on the frequency of the data indicative of the sampled value 222.

Block 1310 sends the found signal 226 to the output circuit 228. For example, the sending may comprise placing a voltage above a threshold value on a particular line into the output circuit 228. In another example, the sending may comprise storing a value at a memory location within CRSM.

Figure 14:
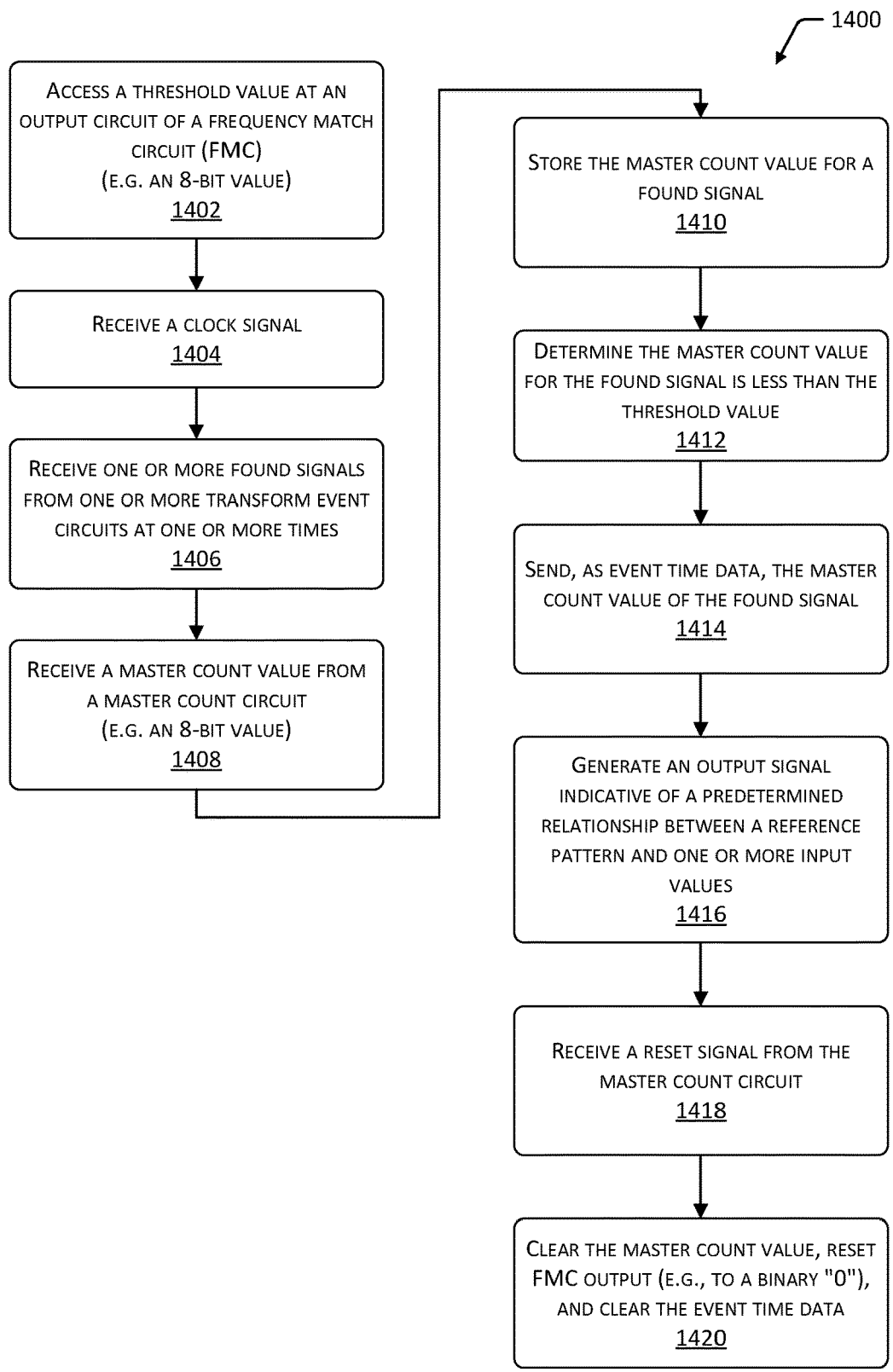
FIG. 14 illustrates a flow diagram of a process of the output circuit in operation.

FIG. 14 illustrates a flow diagram 1400 of a process of the output circuit 228 in operation. As described elsewhere, in some implementations the output circuit 228 may be implemented as discrete hardware 516, programmable hardware, analog circuitry, or as instructions executing on a hardware processor 504.

At an output circuit 228 of an FMC 104, block 1402 accesses a threshold value 206. The threshold value 206 is configured to designate two regions of the master cycle window. A first region indicates an output of "1", while a second region indicates an output of "0" in the case of a digital logic binary implementation. By way of illustration, and not as a limitation, the threshold value 206 may be expressed as an 8-bit value, such as used in the examples herein.

Block 1404 receives a clock signal 210.

Block 1406 receives one or more found signals 226 from one or more transform event circuits 224 at one or more times.

Block 1408 receives a master count value 216 from the master counter circuit 212. For example, the master count value 216 as described elsewhere may comprise an 8-bit value indicative of elapsed time on the master counter of the master counter circuit 212.

Block 1410 stores the master count value 216 for the found signal 226. For example, the master count value 216 may comprise "127" indicating the timing of when the sampled value 222 matched the reference pattern 204.

Block 1412 determines the master count value 216 for the found signal 226 is less than the threshold value 206. In some implementations, the duration of time of processing by the FMC 104 may be considered indicative of a strength of correspondence between the FMC input signal 108 and the reference pattern 204. For example, a short duration of time such as indicated by a low master count value 216 associated with the found signal 226 may indicate a very strong match, while a long duration of time as indicated by a high master count value 216 associated with the found signal 226 may indicate a very weak or non-match.

Block 1414 sends, as event time 230 data, the master count value 216 of the found signal 226. Continuing the example above, the value of "127" may be provided. In some implementations, the event time 230 data may be provided to other FMCs 104. The event time 230 data may be indicative of a duration such as how long the FMC 104 processed the FMC input signal 108 to produce the reference pattern 204.

Block 1416 generates an FMC output signal 110 indicative of a predetermined relationship between the reference pattern 204 and one or more of the input values 220. For example, the reference pattern 204 and the input value 220 may express an identical pattern. In some implementations, the output circuit 228 may be configured to perform an "AND" operation using the found signals 226 as input such that a single binary output is generated.

Block 1418 receives the reset signal 214 from the master counter circuit 212. Based at least in part on the reset signal 214, block 1420 may clear the master count value 216, reset the FMC output signal 110 (such as setting to a binary "0"), and clear the event time 230 data.

Figure 15:
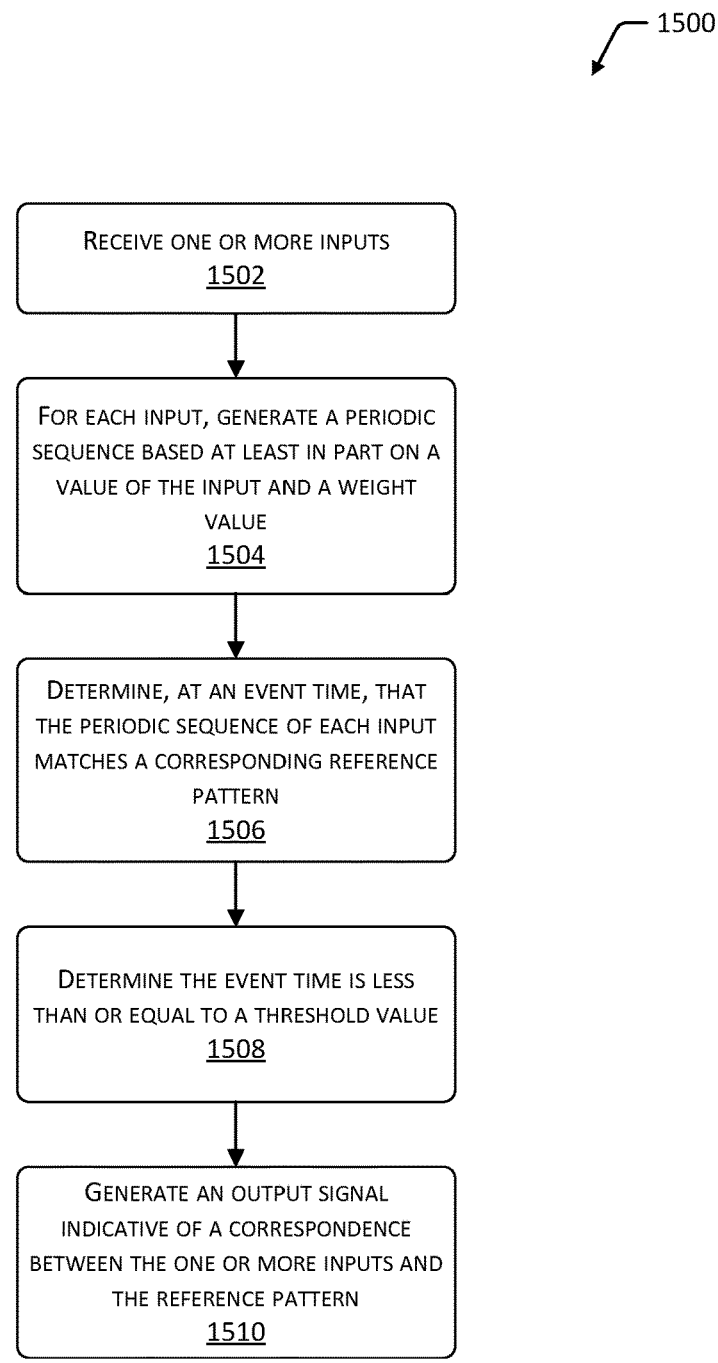
FIG. 15 illustrates a flow diagram of a process of the system in operation.

FIG. 15 illustrates a flow diagram 1500 of a process of the system 100 in operation.

Block 1502 receives one or more inputs. For example, the inputs may comprise the input values 220. The one or more inputs such as the input values 220 may comprise a first sequence of bits. The reference pattern 204 may comprise a second sequence of bits. Thus, the input values 220 and the reference pattern 204 may differ.

For each input, block 1504 generates a periodic sequence 306 based at least in part on a value of the input value 220 and a weight value 202. For example, a trip weight circuit 218 may generate a periodic sequence 306 such as a time varying square wave. The frequency of the square wave may be based on the weight value 202.

Block 1506 determines, at an event time 230, a value of the periodic sequence 306 of each input value 220 matches a corresponding reference pattern 204. Said another way, the event time 230 indicates when the sampled value 222 of the periodic sequence 306 matches the reference pattern 204. The value of the time-varying periodic sequence 306 and the reference pattern 204 are deemed to match when within a threshold level of one another. For example, when expressing the same number, within 10% of one another, and so forth.

Block 1508 determines the event time 230 is less than or equal to a threshold value 206.

Block 1510 generates an output signal, such as a found signal 226, indicative of a correspondence between the one or more input values 220 and the reference pattern 204.

FIGS. 16-30 illustrate circuit diagrams of on implementation of digital data processing circuitry. In the following circuit diagrams the part numbers for devices are provided by way of illustration, and not necessarily as a limitation. For example, other devices of equivalent function may be used instead.

FIG. 16 is a schematic for one implementation of the master counter circuit 212. In this implementation, the master counter is eight bits wide and is composed of U1 and U2, both are 74ls193 devices. In other implementations, other devices may be used. These two devices are 4-bit up down counters, U1 is used for the lower four bits and U2 makes up the upper four bits. Both are configured as up counters and U1 drives U2 by sending the carry out pulse from U1 pin 12 to U2's clock up pin 5. The master counter circuit 212 will count up until it reaches the maximum count 255 with all output pins equaling a logic value of one. Then the master counter circuit 212 will cycle back to all output pins with a logic value of zero and continue counting back to the maximum count. The reset out is derived from the master counter by using devices U3 and U4 which are 74ls08 two input quad AND gates. When all the counter output pins are logical ones the output of the final AND gate will be a logic value of one. For all other counter outputs the final AND gates output will be a logic value of zero. All the output pins of the master counter are available to the output circuit where they are used to generate the event time output.

FIG. 17 is a schematic for one implementation of the counter portion of the trip weight circuit 218. In this implementation, the counter is based on the 74ls193 devices. In other implementations, other devices may be used. These devices are configured as down counters where U5 is the lower four bits and U6 is the upper four bits. U5 controls U6 by connecting the borrow output pin 13 to the clock down pin 4 of U6. The starting count is loaded into the counter each time the counter reaches zero. This is accomplished by the devices U41 and U42 which are 74ls32 Quad OR gates. In other implementations, other devices may be used. The output of the final OR gate is a logic value of zero if all the outputs of the counter are zeros, for all other counter values the final OR gate will output a logical value of one. The output of the final OR gate is connected to the load pin of the two counters which loads the binary value connected to the counter inputs. The counter inputs are connected to the parallel binary latches made from the 74ls175 quad D flip flops U7 and U8. The inputs of the latches are connected to an 8-bit data bus. A load weight input is connected to the clock pin of the 74ls175 devices and is toggled high when the data bus contains the correct value for the weight. The invert data in signal generated by the final OR gate is used by the toggle input circuit to generate a square wave for the input data bit.

FIG. 18 is a schematic for one implementation showing the toggle input portion of the trip weight circuit 218. The 74ls74 U24 is a dual D flip flop which is used to store the state of the trip out signal independent of the data in bit. In other implementations, other devices may be used. The 74ls08 two input Quad NAND gates U9, 74ls02 two input Quad NOR gates U11, and 74ls04 HEX Inverter U13 devices make up the two to one multiplexers. In other implementations, other devices may be used. The first multiplexer is used to control which data gets sent to the D input of the flip flop either the DataIn bit or the current value of trip out. The second multiplexer chooses when to invert or non-invert the trip out value. This multiplexing and temporary storage results in a square wave signal with a period equal to twice the weight value.

Figure 19:
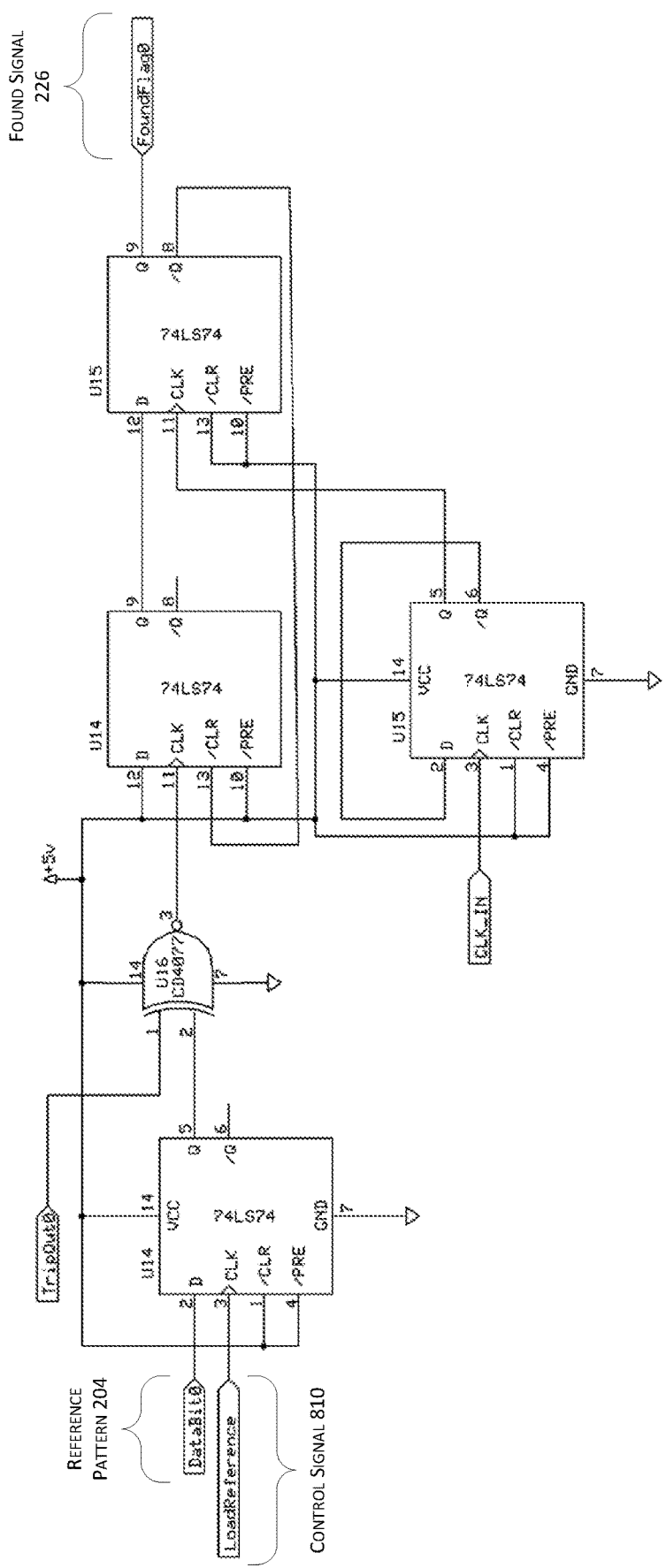

FIG. 19 is a schematic for one implementation showing the transform event circuit 224. It is composed of two 74ls74 Dual D flip flops and one CD4077 two input Quad XNOR gate. In other implementations, other devices may be used. One of the D flip flops is used to latch a single bit of the reference value. One of the XNOR gates from the CD4077 is used as a single bit comparator. In other implementations, other devices may be used. The latched reference bit is compared to the tripOut bit from the trip weight circuit 218, if they are equal the XNOR output is changed to a logic value of one otherwise its output is a logic value of zero. The output of the XNOR is connected to the clock input of another D flip flop. The rising edge changes the Q output to a logic value of one, this temporarily captures the equality of the comparator. A third D flip flop is wired to be a divide by two which stretches the clock signal 210. This stretched clock is used to drive a fourth D flip flop which captures the comparator equality for two clock cycles and supplies a clear signal to the second D flip flop and resets the fourth D flip flop two clock cycles later. This stretched found signal 226 assures that all the found signals 226 for the entire set of inputs is held for one full clock cycle.

FIG. 20 is a schematic of one implementation showing the threshold test section of the output circuit 228. The threshold is provided by the same data bus shown in FIG. 17 and is stored in an 8-bit latch composed of U17 and U18 which are 74ls175 Quad D flip flops. In other implementations, other devices may be used. The outputs of the threshold latches are connected to the A inputs of U19 and U20 which are 74ls85 4-bit comparators. In other implementations, other devices may be used. They are cascaded to form a single 8-bit comparator. The output of the master counter is connected to the B inputs of U19 and U20. U23 a 74ls32 two input quad NOR gate, three of the gates are used to generate a valid detector and a clear bit. If input A is equal to or less than B the NOR gates generate a valid signal, if A is greater than B then a clear bit is generated. The master counter output is connected to U21 and U22 a second 8-bit latch which stores the master count as the event time 230 output. This happens when a valid output bit is generated.

FIG. 21 is a schematic of one implementation showing the output latch for the output circuit 228. This latch is made from one half of a 74ls74 Dual D flip flop. The clock signal 210 is generated by first using U25 a 74ls08 Quad AND gate. The FoundFlags from each input are ANDed together and the final AND gate ANDs the FoundAll signal to the Valid signal. If all the AND operations result in a logic one a rising edge pulse which latches a logic value of one on the output. The output also latches the event time output. The Output value is cleared to a zero when the resetOut is produced by the master counter.

Figure 22:
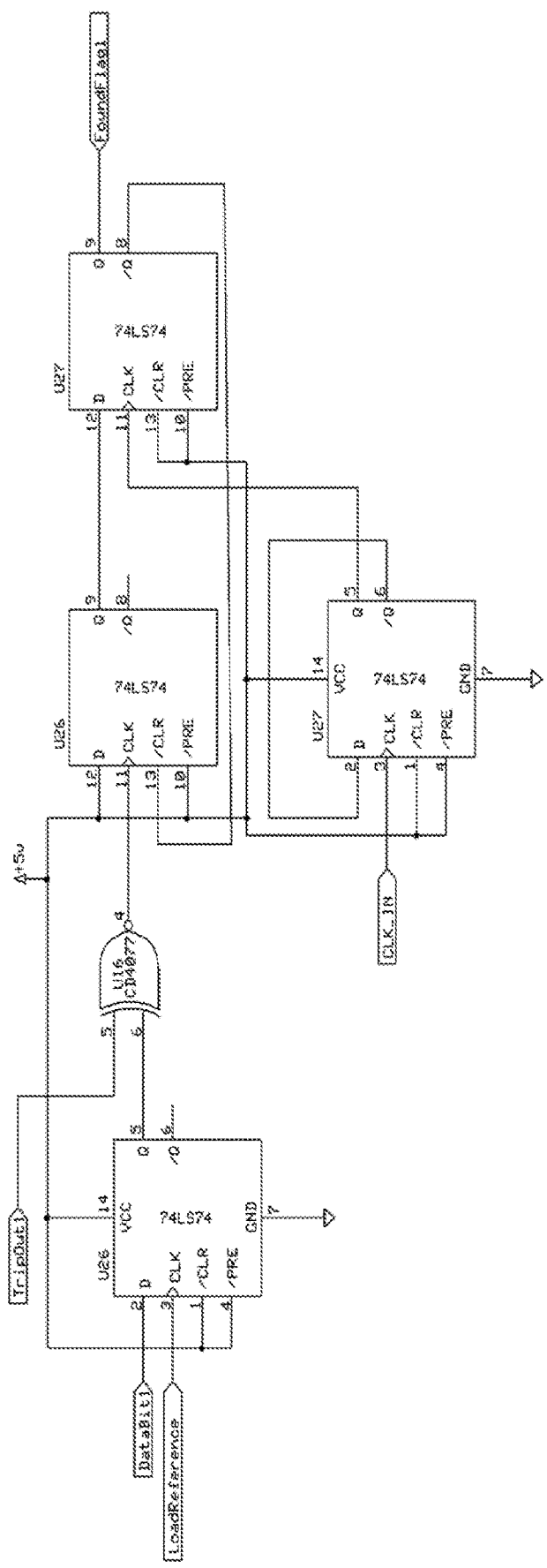
Figure 23:
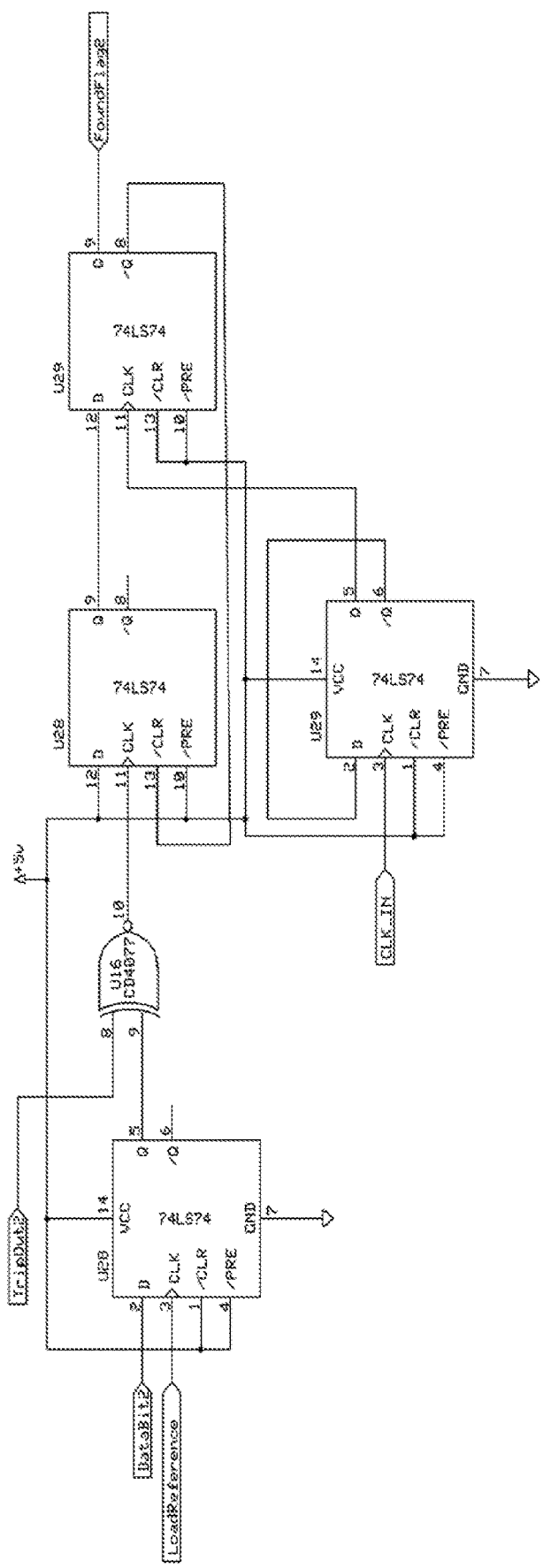
Figure 24:
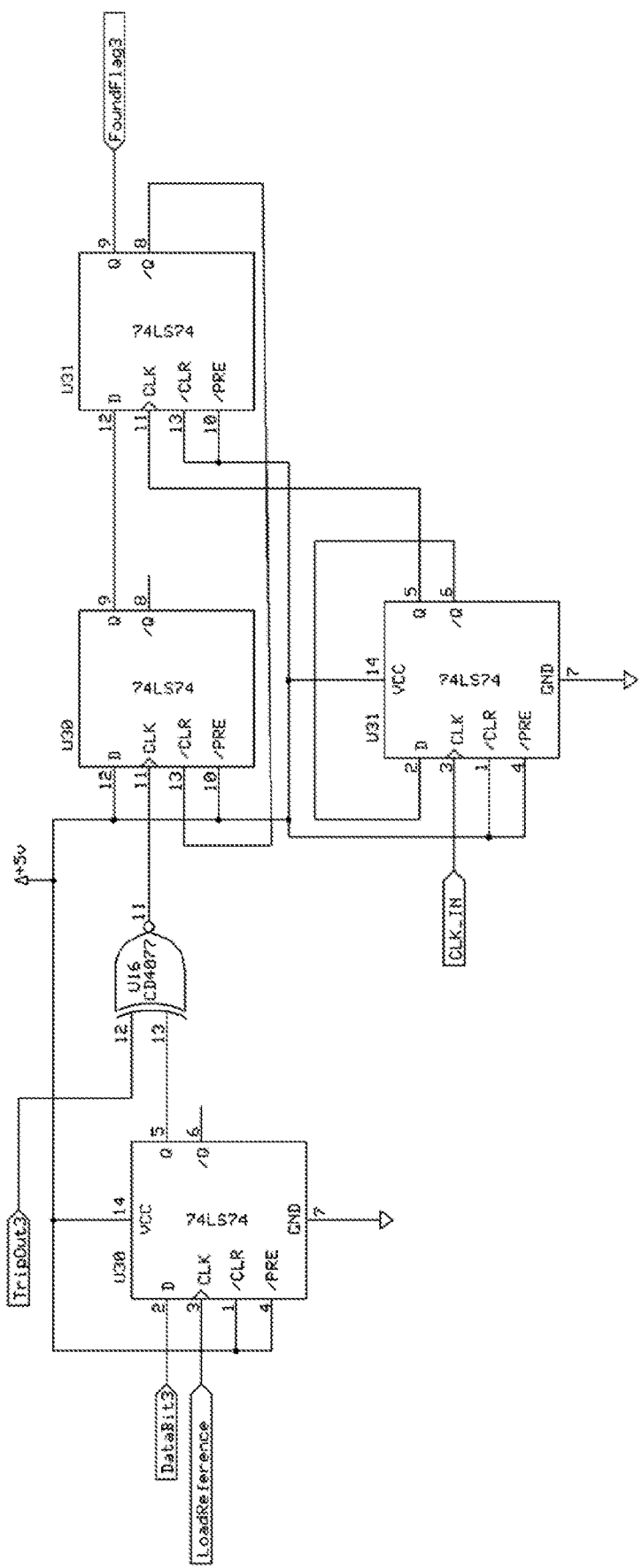

FIGS. 22, 23, and 24 are similar to FIG. 19 and illustrate the circuitry associated with the other three inputs for the FMC 104 as described herein, according to one implementation.

Figure 25:
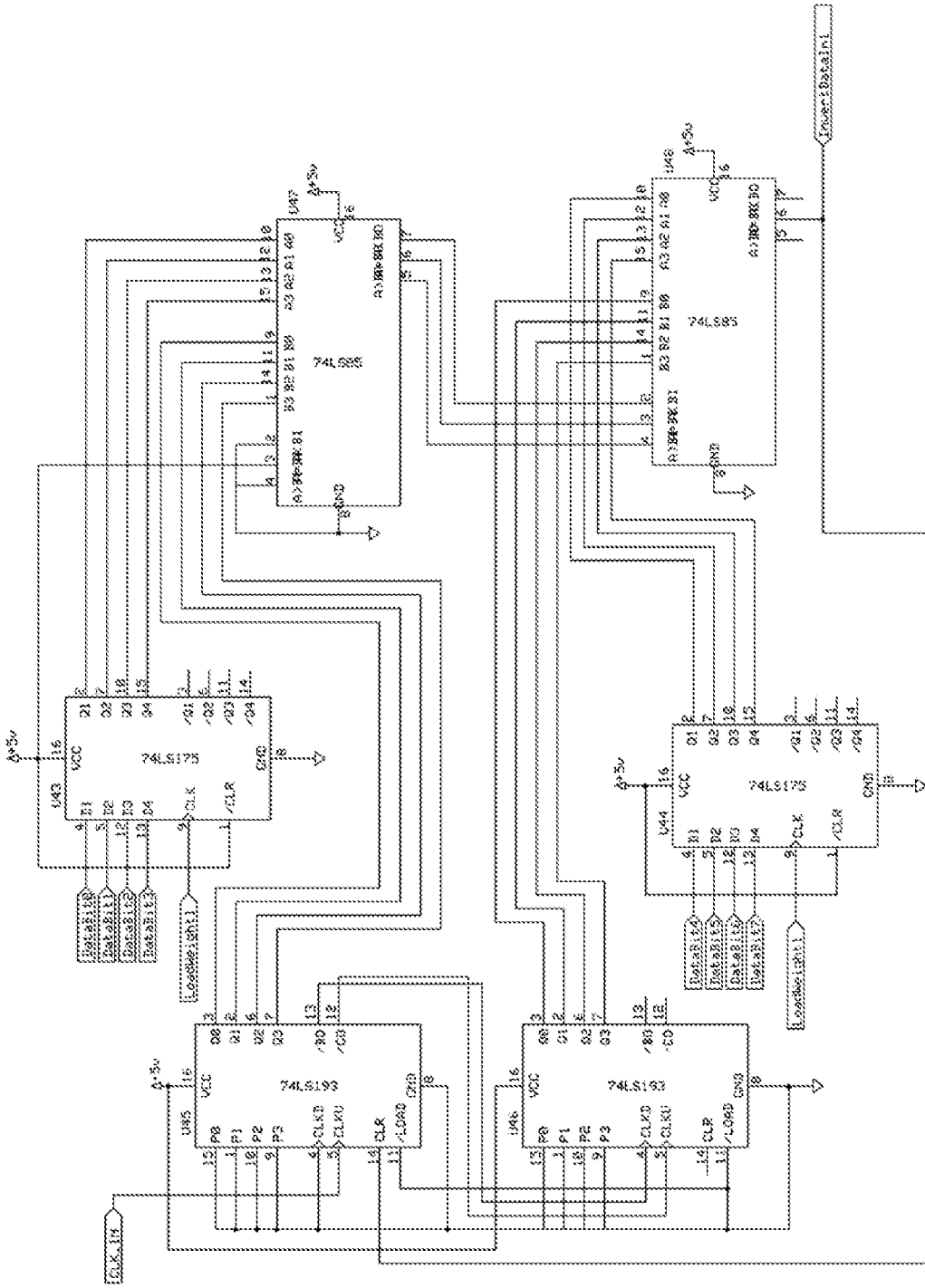
Figure 27:
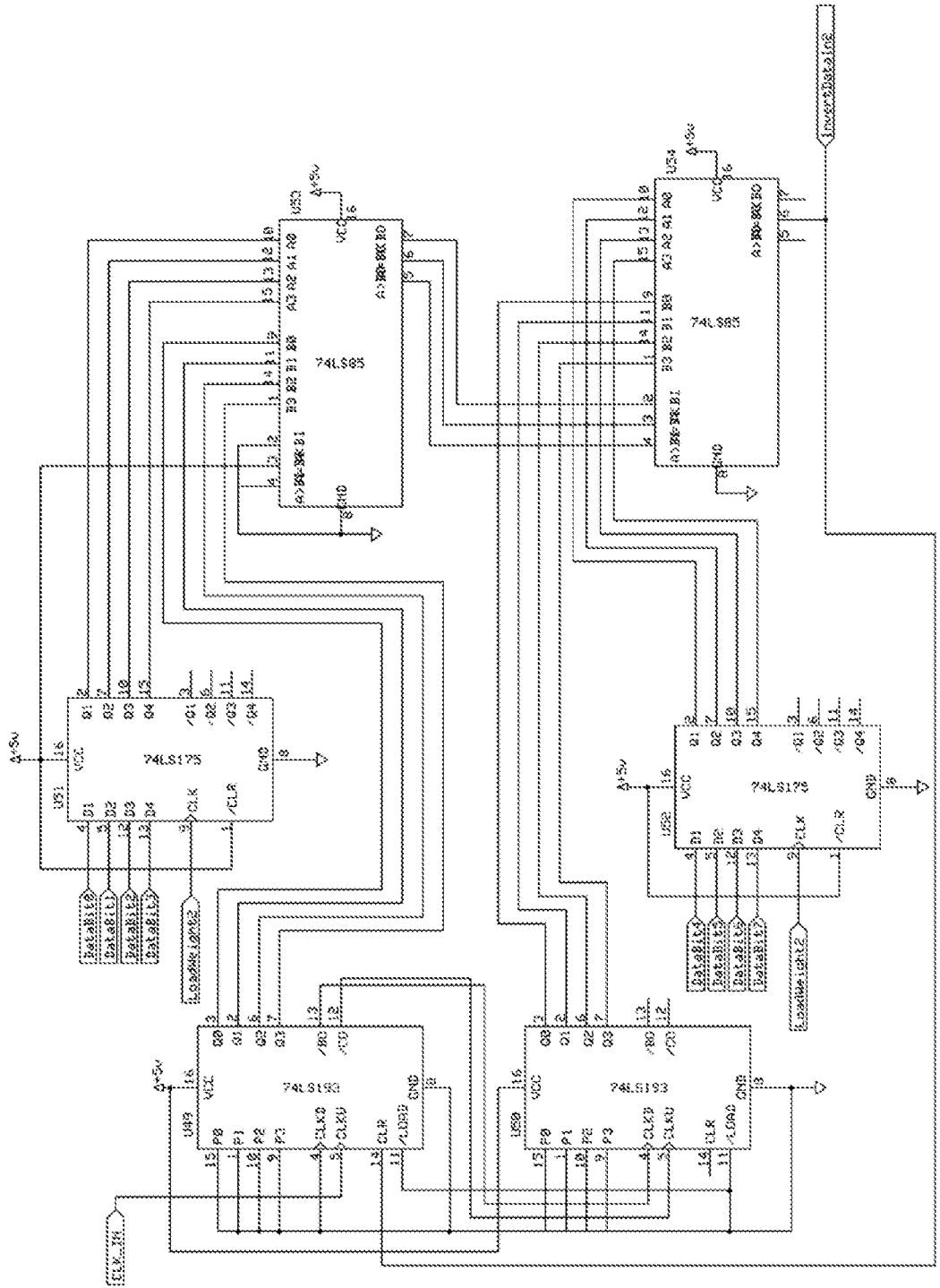
Figure 29:
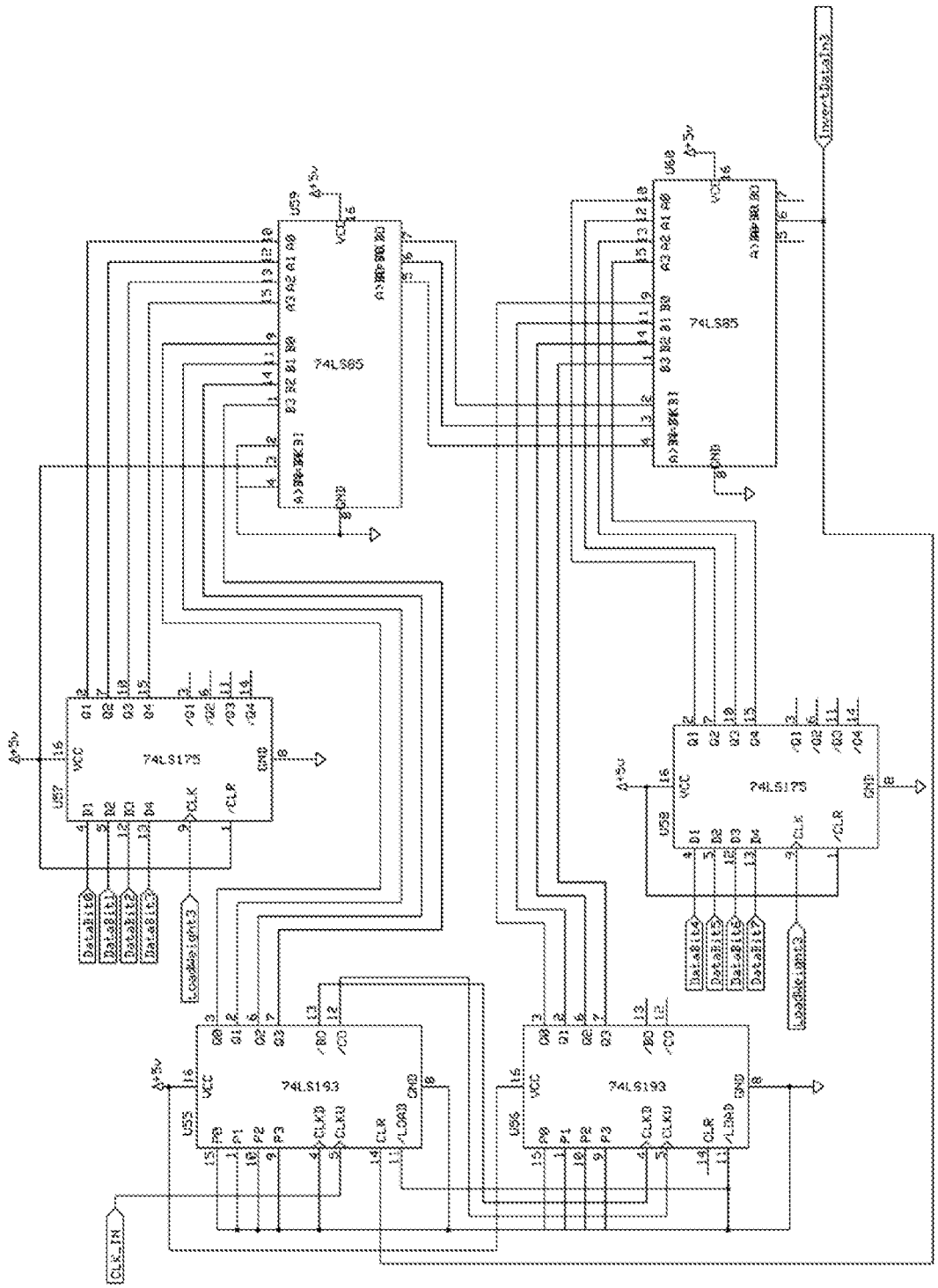

FIGS. 25, 27, and 29 are similar to FIG. 17 and illustrate the circuitry associated with the other three inputs for the FMC 104 as described herein, according to one implementation.

Figure 26:
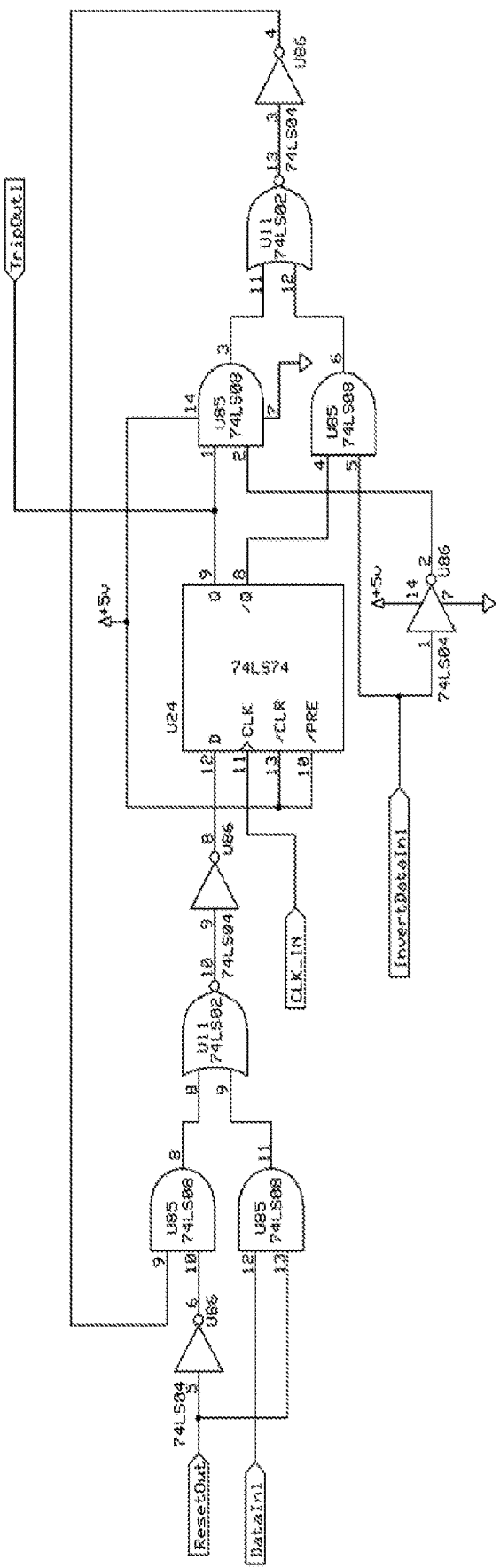
Figure 28:
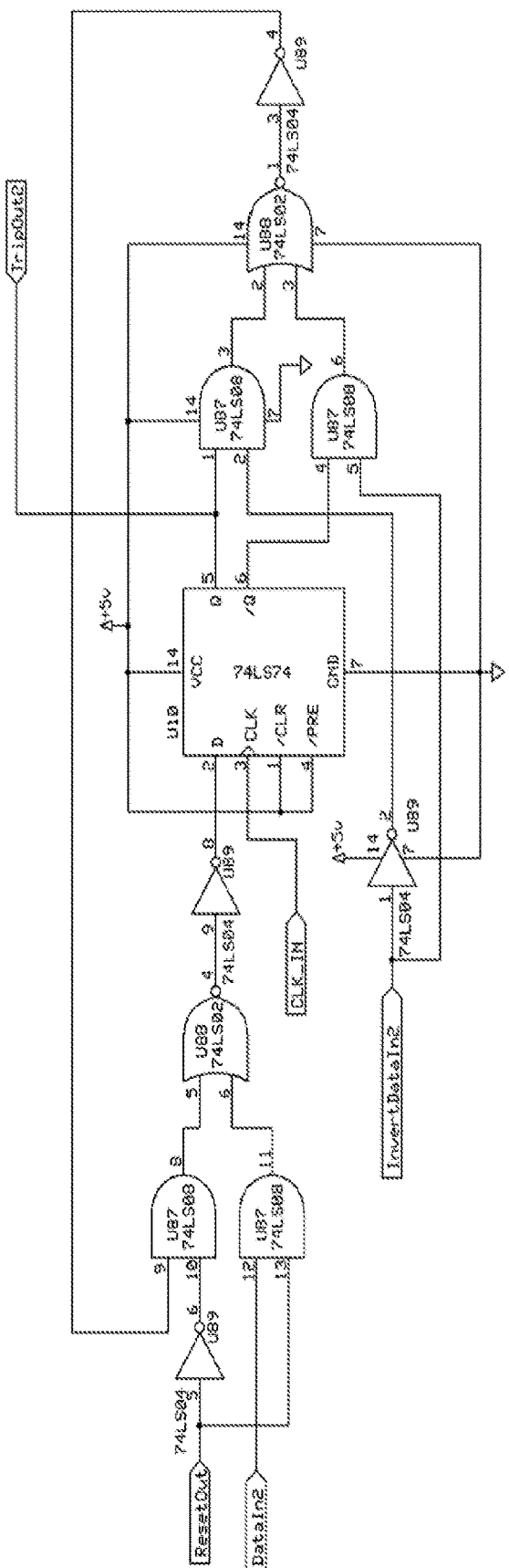
Figure 30:
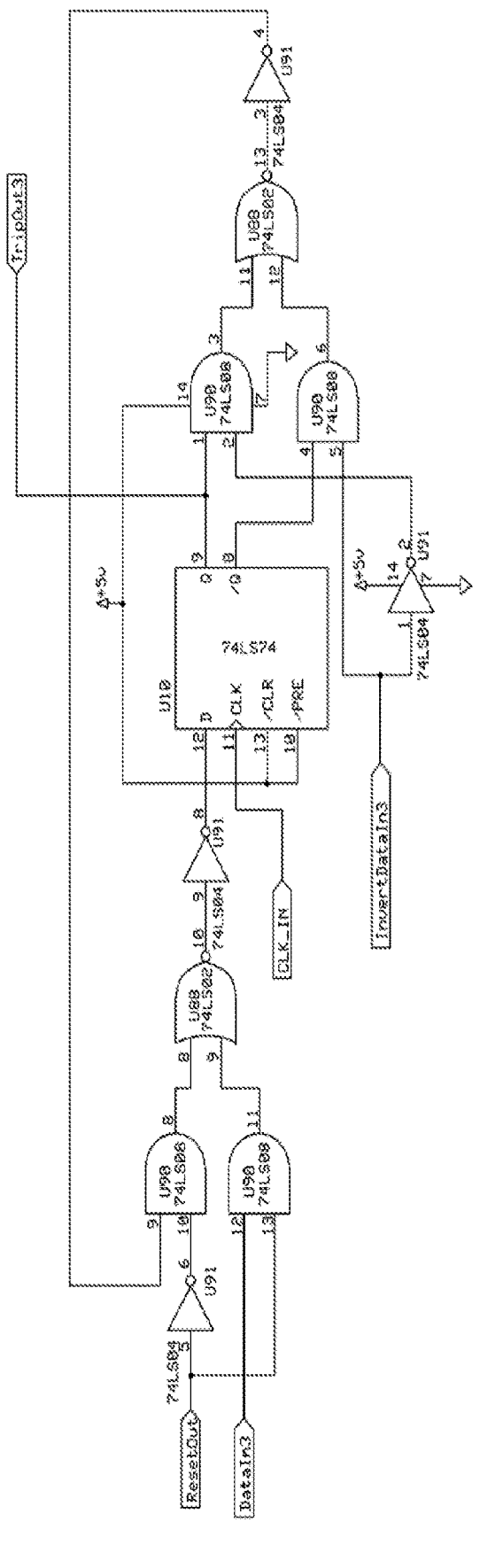

FIGS. 26, 28, and 30 are similar to FIG. 18 and illustrate the circuitry associated with the other three inputs for the FMC 104, according to one implementation.

CONCLUSION

Those having ordinary skill in the art will readily recognize that certain steps or operations illustrated in the figures above can be eliminated or taken in an alternate order. Devices such as particular circuit elements may be replaced with equivalents that provide the functions described herein. Moreover, the methods described above may be implemented as discrete circuitry, programmable hardware, or as one or more software programs for a computer system and are encoded in a computer-readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, optical disks, read-only memories ("ROMs"), random access memories ("RAMs"), erasable programmable ROMs ("EPROMs"), electrically erasable programmable ROMs ("EEPROMs"), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. An apparatus comprising:
    a master counter circuit configured to:
        generate a master count value that is indicative of a master cycle window; and
        generate a reset signal responsive to the master count value being greater than or equal to a maximum value;
    one or more trip weight circuits, wherein each trip weight circuit is configured to:
        accept an input signal representative of data expressed as input values comprising a first number of binary bits;
        accept a weight value associated with the input values;
        generate a first half of a period of a waveform by:
            setting a first level of the waveform to the input values;

initiating a weight counter that counts from a start value to an end value specified by the weight value; and
generating, for each count of the weight counter, a first output at the first level;
generate a second half of the period of the waveform by:
determining the weight counter has reached the end value; and
setting a second level of the waveform by inverting the input values;
wherein the waveform is a continuous square wave having a frequency based on the weight value;
generate, for each count of the weight counter, a second output at the second level; and
reset the weight counter responsive to the reset signal;
one or more transform event circuits, wherein each transform event circuit is configured to:
accept the waveform from a corresponding trip weight circuit;
compare a value of the waveform at a given time to a reference pattern, wherein the reference pattern consists of a second number of binary bits, further wherein the first number of binary bits of the input signal is equal to the second number of binary bits in the reference pattern; and
generate a found signal indicative of a match between the values of the waveform and the reference pattern; and
an output circuit, wherein the output circuit is configured to:
receive found signals from each of the one or more transform event circuits;
determine an event time indicative of a value of the master counter circuit contemporaneous to receiving the found signals;
determine the event time is less than a threshold value;
generate an output signal indicative of the match; and
clear an event timer responsive to the reset signal.

2. The apparatus of claim 1, wherein the waveform is expressed as a sequence of bits.

3. An apparatus comprising:
a master counter circuit configured to:
generate a master count value; and
generate a reset signal responsive to the master count value being greater than or equal to a maximum value;
one or more trip weight circuits, wherein each trip weight circuit is configured to:
accept an input value comprising a first number of binary bits;
accept a weight value associated with the input value;
generate a waveform based at least in part on the input value and the weight value, wherein the waveform is a square wave having a frequency based on the weight value; and
reset a counter responsive to the reset signal;
one or more transform event circuits, wherein each transform event circuit is configured to:
accept the waveform from a corresponding trip weight circuit;
compare a value of the waveform at a given time to a reference pattern, wherein the reference pattern comprises a second number of binary bits and the first number of binary bits is equal to the second number of binary bits; and
generate a found signal indicative of a match between the value of the waveform and the reference pattern; and
an output circuit, wherein the output circuit is configured to:
accept found signals from each of the one or more transform event circuits;
determine an event time, wherein the event time is based at least in part on the master count value;
determine the event time is less than a threshold value;
responsive to the found signals from each of the one or more transform event circuits, generate an output signal indicative of a match; and
responsive to the reset signal, clear an event timer.

4. The apparatus of claim 3, wherein the output signal is provided as an input value to at least a second apparatus.

5. A method implemented in an integrated circuit, the method comprising:
receiving one or more inputs, wherein the one or more inputs comprise a first sequence of bits;
generating, for each input, a time-varying periodic sequence having a first portion and a second portion, wherein:
the time-varying periodic sequence comprises a square wave with a frequency based on a weight value;
the first portion comprises a first level corresponding to an individual input, the first level having a first duration that is based on the weight value; and
the second portion comprises a second level corresponding to an inverted value of the individual input, the second level having a second duration that is based on the weight value;
determining, at an event time, a value of the time-varying periodic sequence of each input matches a corresponding reference pattern comprising a second sequence of bits;
determining the event time is less than or equal to a threshold value; and
generating an output signal indicative of a match between the one or more inputs and the reference pattern.

6. The method of claim 5, wherein the value of the time-varying periodic sequence and the reference pattern are deemed to match when within a threshold level of one another.

* * * * *